United States Patent
Van De Ven

(10) Patent No.: US 9,644,822 B2
(45) Date of Patent: May 9, 2017

(54) LIGHTING DEVICES WITH REMOVABLE LIGHT ENGINE COMPONENTS, LIGHTING DEVICE ELEMENTS AND METHODS

(71) Applicant: CREE, INC., Durham, NC (US)

(72) Inventor: Anthony Paul Van De Ven, Hong Kong (CN)

(73) Assignee: Cree, Inc., Durham, NC (US)

( * ) Notice: Subject to any disclaimer, the term of this patent is extended or adjusted under 35 U.S.C. 154(b) by 134 days.

(21) Appl. No.: 14/581,152

(22) Filed: Dec. 23, 2014

(65) Prior Publication Data

US 2015/0138768 A1 May 21, 2015

Related U.S. Application Data

(62) Division of application No. 12/852,849, filed on Aug. 9, 2010, now Pat. No. 8,960,989.

(51) Int. Cl.
*H01L 33/00* (2010.01)
*F21V 21/088* (2006.01)
(Continued)

(52) U.S. Cl.
CPC .......... *F21V 21/088* (2013.01); *F21V 19/001* (2013.01); *F21V 19/003* (2013.01);
(Continued)

(58) Field of Classification Search
CPC ...... F21V 21/088; F21V 29/74; F21V 19/001; F21V 19/0055; F21V 19/003;
(Continued)

(56) References Cited

U.S. PATENT DOCUMENTS 6,998,650 B1 * 2/2006 Wu .......................... F21K 9/00
257/100
7,549,786 B2 6/2009 Higley et al.
(Continued)

FOREIGN PATENT DOCUMENTS

EP 1 416 219 5/2004

OTHER PUBLICATIONS

International Search Report and Written Opinion of the ISA from a corresponding international patent application bearing a mailing date of Oct. 25, 2011, 11 pages.
(Continued)

*Primary Examiner* — Tracie Y Green
(74) *Attorney, Agent, or Firm* — Burr & Brown, PLLC

(57) ABSTRACT

A lighting device, comprising a lighting device element and a light engine component (comprising a solid state light emitter) that is removably supported by the lighting device element. Also, lighting device elements that comprise a lens, a housing member, a mechanical engagement region, an electrical contact region and/or means for removably supporting a light engine component. Also, lighting device elements in which a retaining structure holds a light engine component, a portion of a light engine component is exposed to a lens. Also, lighting devices that comprise means for removably supporting a light engine component. Also, methods that comprise removing a light engine component from a lighting device element and removably supporting a second light engine component on the lighting device element.

17 Claims, 10 Drawing Sheets

Figure 1:
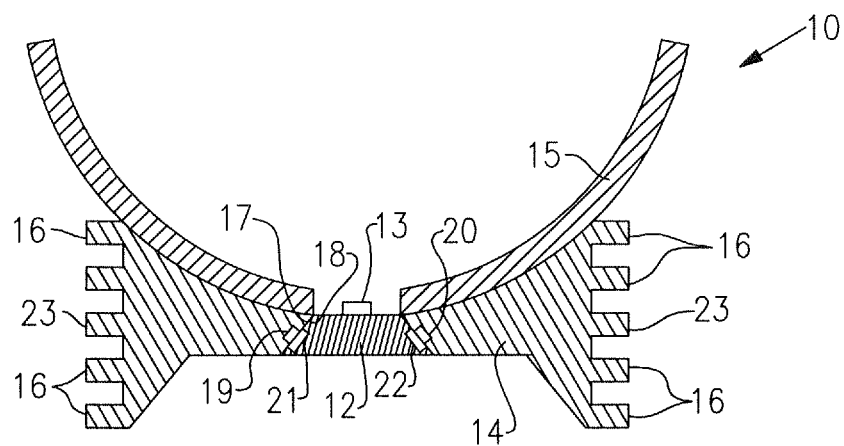

(51) Int. Cl.
*H05B 33/08* (2006.01)
*F21V 19/00* (2006.01)
*F21V 23/04* (2006.01)
*F21V 29/74* (2015.01)
*F21Y 101/00* (2016.01)

(52) U.S. Cl.
CPC ...... *F21V 19/0045* (2013.01); *F21V 19/0055* (2013.01); *F21V 23/0442* (2013.01); *F21V 29/74* (2015.01); *H05B 33/0803* (2013.01); *F21Y 2101/00* (2013.01); *Y02B 20/19* (2013.01)

(58) Field of Classification Search
CPC .............. F21V 19/0045; F21V 23/0442; H05B 33/0803; F21Y 2101/02; Y02B 20/19
See application file for complete search history.

(56) References Cited

U.S. PATENT DOCUMENTS

| | | |
|---|---|---|
| 7,972,037 B2 | 7/2011 | Anderson |
| 2003/0031028 A1 | 2/2003 | Murray et al. |
| 2004/0107615 A1 | 6/2004 | Pare |
| 2007/0139921 A1* | 6/2007 | Wu .......................... F21V 23/02 362/240 |
| 2008/0225538 A1 | 9/2008 | Lynam et al. |
| 2008/0290359 A1 | 11/2008 | Inoue et al. |
| 2008/0309255 A1 | 12/2008 | Myers |
| 2009/0103296 A1 | 4/2009 | Harbers et al. |
| 2009/0160302 A1* | 6/2009 | Imai ...................... F21V 19/001 313/1 |
| 2009/0207609 A1 | 8/2009 | Higley et al. |
| 2011/0006684 A1 | 1/2011 | Hodgson et al. |
| 2011/0051420 A1* | 3/2011 | Gill .......................... F21S 8/086 362/249.03 |
| 2011/0198984 A1 | 8/2011 | Van de Ven |
| 2011/0211351 A1 | 9/2011 | Van de Ven |

OTHER PUBLICATIONS

U.S. Appl. No. 61/245,688, filed Sep. 25, 2009, Pickard.

* cited by examiner

LIGHTING DEVICES WITH REMOVABLE LIGHT ENGINE COMPONENTS, LIGHTING DEVICE ELEMENTS AND METHODS

CROSS-REFERENCE TO RELATED APPLICATIONS

This application is a division of U.S. patent application Ser. No. 12/852,849, filed Aug. 9, 2010, (now U.S. Patent Publication No. 2012/0033429, the entirety of which is incorporated herein by reference as if set forth in its entirety.

FIELD OF THE INVENTIVE SUBJECT MATTER

The present inventive subject matter is directed to lighting devices that comprise one or more removable light engine components. The present inventive subject matter is also directed to lighting device elements into which one or more light engine components can be removably inserted. The present inventive subject matter is also directed to methods of inserting one or more light engine components into a lighting device element, and to methods of removing and/or replacing one or more light engine components in a lighting device.

BACKGROUND

There is an ongoing effort to develop systems that are more energy-efficient. A large proportion (some estimates are as high as twenty-five percent) of the electricity generated in the United States each year goes to lighting, a large portion of which is general illumination (e.g., downlights, flood lights, spotlights and other general residential or commercial illumination products). Accordingly, there is an ongoing need to provide lighting that is more energy-efficient.

Solid state light emitters (e.g., light emitting diodes) are receiving much attention due to their energy efficiency. It is well known that incandescent light bulbs are very energy-inefficient light sources—about ninety percent of the electricity they consume is released as heat rather than light. Fluorescent light bulbs are more efficient than incandescent light bulbs (by a factor of about 10) but are still less efficient than solid state light emitters, such as light emitting diodes.

In addition, as compared to the normal lifetimes of solid state light emitters, e.g., light emitting diodes, incandescent light bulbs have relatively short lifetimes, i.e., typically about 750-1000 hours. In comparison, light emitting diodes have typical lifetimes between 50,000 and 70,000 hours. Fluorescent bulbs generally have lifetimes that are longer than those of incandescent lights (e.g., some fluorescent bulbs have reported lifetimes of 10,000-20,000 hours), but they typically provide less favorable color reproduction. The typical lifetime of conventional fixtures is about 20 years, corresponding to a light-producing device usage of at least about 44,000 hours (based on usage of 6 hours per day for 20 years). Where the light-producing device lifetime of the light emitter is less than the lifetime of the fixture, the need for periodic change-outs is presented. The impact of the need to replace light emitters is particularly pronounced where access is difficult (e.g., vaulted ceilings, bridges, high buildings, highway tunnels) and/or where change-out costs are extremely high.

There are a number of challenges presented with using solid state light emitters in lighting devices. In many cases, additional components are added to the lighting devices in order to address these challenges. It would be desirable to provide a lighting device that comprises one or more solid state light emitters, in which such challenges are addressed and yet the lighting device can fit within the same or substantially the same space that is provided for comparable conventional lighting devices (e.g., the space occupied by conventional incandescent light sources and/or fluorescent light sources). The ability for a lighting device that includes one or more solid state light emitters to fit in a space that is similar to (or identical to) a space that would be occupied by conventional devices is important when retro-fitting a lighting device, as well when installing a lighting device in new construction.

One such challenge results from the fact that the emission spectrum of any particular light emitting diode is typically concentrated around a single wavelength (as dictated by the light emitting diode's composition and structure), which is desirable for some applications, but not desirable for others, (e.g., for providing general illumination, such an emission spectrum generally does not provide light that appears white, and/or provides a very low CRI Ra). As a result, in many cases (e.g., to make devices that emit light perceived as white or near-white, or to make devices that emit light that is not highly saturated) it is necessary to employ light sources (e.g., one or more light emitting diodes and optionally also one or more other types of light sources, e.g., additional light emitting diodes, luminescent materials, incandescent lights, etc.) that emit light of different colors. There are a variety of reasons that one or more solid state light emitters might cease emitting light and/or vary in their intensity of light emission, which can throw off the balance of color output and cause the lighting device to emit light that is perceived as being of a color that differs from the desired color of light output. As a result, in many of such devices, one challenge that necessitates the inclusion of additional components is that there may be a desire to provide additional circuitry that can adjust the current supplied to respective solid state light emitters (and/or other light emitters) in order to maintain the balance of color output among the light emitters that emit light of different colors in order to achieve the desired color output.

Another such challenge is that there may be a desire to mix the light of different colors emitted from the different solid state light emitters by providing additional structure to assist in such mixing.

One example of a reason that one or more solid state light emitters might vary in their intensity of light emission is temperature change (resulting, e.g., from change in ambient temperature and/or heating up of the solid state light emitters and/or surrounding components or structures). Some types of solid state light emitters (e.g., solid state light emitters that emit light of different colors) experience differences in intensity of light emission (if supplied with the same current) at different temperatures, and frequently such changes in intensity occur to differing extents for emitters that emit light of different colors as temperature changes. For example, some light emitting diodes that emit red light have a very strong temperature dependence in at least some temperature ranges (e.g., AlInGaP light emitting diodes can reduce in optical output by ~20% when heated up by ~40 degrees C., that is, approximately −0.5% per degree C.; some blue light emitting InGaN+YAG:Ce light emitting diodes can reduce in optical output by about −0.15%/degree C.). Various heat sinking schemes have been developed to dissipate at least some of the heat that is generated by the LED. See, for example, Application Note: CLD-APO6.006, entitled *Cree® XLamp® XR Family & 4550 LED Reliability*, published at cree.com/xlamp, September 2008.

Another example of a reason that one or more solid state light emitters might vary in their intensity of light emission is aging. Some solid state light emitters (e.g., solid state light emitters that emit light of different colors) experience decreases in intensity of light emission (if supplied with the same current) as they age, and frequently such decreases in intensity occur at differing rates for solid state light emitters that emit light of different colors.

Another example of a reason that one or more solid state light emitters might vary in their intensity of light emission is damage to the solid state light emitter(s) and/or damage to circuitry that supplies current to the solid state light emitter(s).

Another challenge presented in making a lighting device with light emitting diodes, that often necessitates the inclusion of additional components, is that the performance of many solid state light emitters may be reduced when they are subjected to elevated temperatures. For example, many light emitting diode light sources have average operating lifetimes of decades as opposed to just months or 1-2 years for many incandescent bulbs, but some light emitting diodes' lifetimes can be significantly shortened if they are operated at elevated temperatures. A common manufacturer recommendation is that the junction temperature of a light emitting diode should not exceed 85 degrees C. if a long lifetime is desired. There may be a desire to counteract such problems, in many instances, by providing additional structure (or structures) to provide a desired degree of heat dissipation.

Another challenge presented in making a lighting device with light emitting diodes, that often necessitates the inclusion of additional components, arises from the relatively high light output from a relatively small area provided by solid state emitters. Such a concentration of light output may present challenges in providing solid state lighting systems for general illumination in that, in general, a large difference in brightness in a small area may be perceived as glare and may be distracting to occupants. In many instances, therefore, there is a desire to provide additional structure to assist in mixing the emitted light and/or creating the perception that the emitted light is output through a larger area.

Another challenge presented in making a lighting device with light emitting diodes, that often necessitates the inclusion of additional components, is that light emitting diodes are typically operated most effectively on low voltage DC current, while line voltage is typically much higher voltage AC current. As a result, there is often a desire to provide circuitry that converts line voltage, e.g., from AC to DC and/or that reduces voltage.

In addition, in some circumstances, there is a desire either to retrofit or install a lighting device in a circuit that has a conventional dimmer. Some dimmers operate based on signals contained in the current supplied to the lighting device (for example, duty cycle of an AC signal, e.g., from a triac), for which additional circuitry is generally needed.

It would be desirable to be able to make a variety of lighting devices that include different numbers of solid state light emitters (and which thereby generate heat at a variety of different rates), and to be able to address the effects caused by such different rates of heat generation (including elevated rates of heat generation), and/or to be able to make such lighting devices in a wide variety of shapes and sizes, including those that correspond to conventional lighting devices.

There exist conventional lighting devices that have light intensity outputs and/or power inputs that would require a wide variety of circuitry in order to provide equivalent output from a lighting device comprising one or more solid state light emitters, and it would be desirable to be able to easily make a variety of solid state light emitter lighting devices that can provide such light intensity outputs and/or that can be powered by such power inputs.

BRIEF SUMMARY

As noted above, one very attractive quality of solid state lighting is its efficiency and hence its low operating cost. One way to make solid state lighting more attractive would be to extend the already superior useful life of at least some of the components of lighting devices that employ solid state lighting, whereby the initial equipment cost (as well as the cost over time) could be even further reduced in comparison with other lighting options.

Solid state lighting devices typically degrade over time (although such degradation generally takes much longer to occur than in the cases of other lighting options, such as incandescent lights and fluorescent lights). Such degradation is typically more rapid when the solid state light emitter(s) in the solid state lighting device is/are subjected to higher temperatures.

Another challenge with solid state lighting devices is color shift. Energy star has limits that the color of light emission from a solid state lighting device should change over time. The current limit is set at delta u'v' of not greater than 0.007 for 6000 hours of operation, and a proposed maximum for fixtures is not greater than 0.001 or 0.002, depending on whether the fixture is commercial grade or residential grade. One of the reasons that light emitted by solid state light emitting devices (e.g., that comprise one or more LEDs and one or more luminescent materials) changes in color over time is that the encapsulant (e.g., silicone or epoxy) sometimes degrades slightly with exposure to heat and exposure to blue light over time.

In accordance with one aspect of the present inventive subject matter, there is provided a lighting device that comprises at least one lighting device element (which can comprise one or more housing members, one or more lenses, one or more electrical connectors and/or one or more reflective elements) and at least one removable light engine component (which comprises at least one solid state light emitter, e.g., a light emitting diode chip, a packaged LED or a light engine module). With such a device, it is possible to periodically replace the light engine component (or light engine components), according to a predetermined schedule or whenever deemed necessary. In such a way, the lifetime of the lighting device can be extended, and/or the lighting device can be operated at higher temperature (i.e., to generate more light) than would otherwise be possible.

For example, in satisfying a given lighting requirement (e.g., overall brightness in a particular room, e.g., a dining area in a restaurant), equipment cost can be reduced by using fewer lighting devices (each lighting device comprising at least one removable light engine component) and supplying higher current to the solid state light emitter (or to at least one of the solid state light emitters) to make up for the fewer number of lighting devices. In such a case, it is recognized that the higher operating temperatures generated by operating the at least one solid state light emitter at higher current may cause the lighting device(s) to degrade more rapidly, but that the effects of such degradation can be addressed by replacing the light engine component (or one or more of a plurality of light engine components) at the onset of degradation (or at any other stage of degradation).

Alternatively or additionally, equipment cost can be reduced (or further reduced) by eliminating one or more heat sink elements that would otherwise be provided in order for the operating temperature of the at least one solid state light emitter to be held to a level at which degradation of the at least one solid state light emitter is deemed to be acceptable, recognizing that the effects of more rapid degradation of the at least one solid state light emitter resulting from such higher operating temperatures can be addressed by replacing the light engine component (or one or more of a plurality of light engine components) at the onset of degradation (or at any other stage of degradation).

By providing a lighting device in which a light engine component is removable and/or can be replaced, color shift problems can be addressed, especially if the current used to drive the light emitter(s), the heat generated and the cost of materials are selected to minimize equipment cost.

In accordance with an aspect of the present inventive subject matter, there is provided a lighting device that comprises a lighting device element and at least a first light engine component.

In accordance with another aspect of the present inventive subject matter, there is provided a lighting device, comprising:

a lighting device element that comprises at least a first electrical contact region; and at least a first light engine component that comprises at least a first solid state light emitter and at least a second electrical contact region, the first light engine component being removably supported by the lighting device element, the first electrical contact region being in electrical contact with the second electrical contact region.

In some embodiments according to this aspect, which can include or not include, as suitable, any of the other features described herein, first light engine component can be a solid state light emitter. In some of such embodiments, the solid state light emitter can be a chip.

In some embodiments according to this aspect, which can include or not include, as suitable, any of the other features described herein, the first light engine component can comprise a solid state light emitter and an encapsulant.

In some embodiments according to this aspect, which can include or not include, as suitable, any of the other features described herein, the first light engine component can comprise a light engine module that comprises at least a first solid state light emitter support member, the first solid state light emitter mounted on the first solid state light emitter support member.

In some embodiments according to this aspect, which can include or not include, as suitable, any of the other features described herein:

the lighting device element can comprise at least a first mechanical engagement region, the first light engine component can comprise at least a second mechanical engagement region, and/or the first mechanical engagement region can be in contact with the second mechanical engagement region.

In some embodiments according to this aspect, which can include or not include, as suitable, any of the other features described herein:

the first light engine component can comprise a light engine module that comprises at least a first solid state light emitter support member, the first solid state light emitter can be mounted on the first solid state light emitter support member, the lighting device element can further comprise at least a first mechanical engagement region, the first solid state light emitter support member can comprise a second mechanical engagement region, and the first mechanical engagement region is in contact with the second mechanical engagement region.

In some embodiments according to this aspect, which can include or not include, as suitable, any of the other features described herein, the lighting device element comprises at least a first housing member.

In some embodiments according to this aspect, which can include or not include, as suitable, any of the other features described herein:

the lighting device element can comprise at least a first housing member, the lighting device element can further comprise at least a first mechanical engagement region, the housing member can comprise at least a second mechanical engagement region, the first mechanical engagement region can be in contact with the second mechanical engagement region, the first mechanical engagement region can be substantially tapered (e.g., frustoconical), and the second mechanical engagement region can be substantially tapered (e.g., frustoconical).

In some embodiments according to this aspect, which can include or not include, as suitable, any of the other features described herein, the lighting device element comprises at least a first housing member that comprises at least a first heat dissipation structure (e.g., at least one pin or fin).

In some embodiments according to this aspect, which can include or not include, as suitable, any of the other features described herein, the lighting device element comprises at least a first housing member and at least one element selected from among an electrical connector, a lens and a reflective element.

In some embodiments according to this aspect, which can include or not include, as suitable, any of the other features described herein:

the lighting device element comprises at least a first housing member, and the first housing member comprises at least a first cavity in which at least a portion of the first light engine component is located.

In some embodiments according to this aspect, which can include or not include, as suitable, any of the other features described herein:

the lighting device element further comprises at least a first locking member that has at least a first unlocked position and at least a first locked position, the first locking member holds the first light engine component in place relative to the lighting device element if the first locking member is in the first locked position, and the first locking member does not hold the first light engine component in place relative to the lighting device element if the first locking member is in the first unlocked position.

In some embodiments according to this aspect, which can include or not include, as suitable, any of the other features described herein:

the lighting device element comprises at least a first substantially transparent element, and if the first solid state light emitter is illuminated, at least some of the light emitted by the first solid state light emitter would pass through at least a portion of the first substantially transparent element. In some of such embodiments, the first substantially transparent element defines at least a first hollow region.

In some embodiments according to this aspect, which can include or not include, as suitable, any of the other features described herein, the lighting device element comprises at least a first retaining structure which removably holds the first light engine component in place relative to the lighting device element.

In some embodiments according to this aspect, which can include or not include, as suitable, any of the other features described herein, the lighting device element comprises at least one notch in which at least a portion of the first light engine component is positioned.

In some embodiments according to this aspect, which can include or not include, as suitable, any of the other features described herein:
- the first light engine component can comprise a light engine module that comprises at least a first solid state light emitter support member,
- the first solid state light emitter can be mounted on the first solid state light emitter support member, and
- the first solid state light emitter support member can comprise at least one element selected from among circuit boards, circuitry components, electrical contacts and electrical traces.

In accordance with another aspect of the present inventive subject matter, there is provided a lighting device element, comprising:
- at least a first lens; and
- at least a first housing member, the first housing member comprising at least a first mechanical engagement region, the first mechanical engagement region comprising at least a first recess, at least a portion of the first recess being exposed to the first lens.

In some embodiments according to this aspect, which can include or not include, as suitable, any of the other features described herein:
- the first housing member comprises at least a first electrical contact region, and
- at least a portion of the first electrical contact region is on a surface of the housing member that at least partially defines the first recess.

In some embodiments according to this aspect, which can include or not include, as suitable, any of the other features described herein:
- the first mechanical engagement region is on a surface of the first housing member, and
- the first mechanical engagement region is substantially tapered (e.g., frustoconical).

In some embodiments according to this aspect, which can include or not include, as suitable, any of the other features described herein, the first housing member comprises at least a first heat dissipation structure (e.g., at least one pin or fin).

In some embodiments according to this aspect, which can include or not include, as suitable, any of the other features described herein, the lighting device element further comprises at least one element selected from among an electrical connector and a reflective element.

In some embodiments according to this aspect, which can include or not include, as suitable, any of the other features described herein:
- the lighting device element further comprises at least a first locking member that has at least a first unlocked position and at least a first locked position, and
- if a light engine component were positioned with at least a portion of the light engine component in the first recess:
    - the first locking member would hold the light engine component in place relative to the lighting device element if the first locking member were in the first locked position, and
    - the first locking member would not hold the first light engine component in place relative to the lighting device element if the first locking member were in the first unlocked position.

In some embodiments according to this aspect, which can include or not include, as suitable, any of the other features described herein, the first recess is in the form of a notch, a cavity or an indentation.

In accordance with another aspect of the present inventive subject matter, there is provided a lighting device element, comprising:
- at least a first lens; and
- a housing member that comprises at least a first retaining structure and at least a first electrical contact region, the first retaining structure configured to hold a light engine component relative to the lighting device element at a location where at least a portion of the light engine component would be exposed to the first lens.

In some embodiments according to this aspect, which can include or not include, as suitable, any of the other features described herein, the housing member further comprises at least a first electrical contact region.

In accordance with another aspect of the present inventive subject matter, there is provided a lighting device, comprising:
- a lighting device element;
- at least a first light engine component; and
- means for removably supporting the first light engine component relative to the lighting device element, the first light engine component comprising at least a first solid state light emitter.

In some embodiments according to this aspect, which can include or not include, as suitable, any of the other features described herein:
- the lighting device element comprises at least a first electrical contact region,
- the first light engine component further comprises at least a second electrical contact region, and
- the first electrical contact region is in electrical contact with the second electrical contact region.

In some embodiments according to this aspect, which can include or not include, as suitable, any of the other features described herein, the lighting device element comprises at least a first housing member that comprises at least a first heat dissipation structure.

In some embodiments according to this aspect, which can include or not include, as suitable, any of the other features described herein:
- the lighting device element comprises at least a first locking member that has at least a first unlocked position and at least a first locked position,
- the first locking member holds the first light engine component in place relative to the lighting device element if the first locking member is in the first locked position, and
- the first locking member does not hold the first light engine component in place relative to the lighting device element if the first locking member is in the first unlocked position.

In some embodiments according to this aspect, which can include or not include, as suitable, any of the other features described herein:

the lighting device element comprises at least a first substantially transparent element, and if the first solid state light emitter is illuminated, at least some of the light emitted by the first solid state light emitter would pass through at least a portion of the first substantially transparent element. In some of such embodiments, the first substantially transparent element defines at least a first hollow region.

In accordance with another aspect of the present inventive subject matter, there is provided a lighting device element, comprising:

at least a first lens;

at least a first housing member; and means for removably supporting a light engine component relative to the first housing member with at least a portion of the light engine component being exposed to the first lens.

In accordance with another aspect of the present inventive subject matter, there is provided a method, comprising removably supporting any light engine component according to the description herein on any lighting device element according to the description herein (or mounting any light engine component according to the description herein to any lighting device element according to the description herein).

In accordance with another aspect of the present inventive subject matter, there is provided a method, comprising:

removing at least a first light engine component from a lighting device element, and removably supporting at least a second light engine component on the lighting device element, the second light engine component comprising at least a first solid state light emitter.

In some embodiments according to this aspect, which can include or not include, as suitable, any of the other features described herein:

the lighting device element comprises at least a first housing member, a first mechanical engagement region is on a surface of the first housing member, the first mechanical engagement region is substantially tapered, A second mechanical engagement region is provided on the light engine component, and the second mechanical engagement region is substantially tapered.

In some embodiments according to this aspect, which can include or not include, as suitable, any of the other features described herein:

the lighting device element comprises at least a first housing member, and the first housing member comprises at least a first cavity.

In some embodiments according to this aspect, which can include or not include, as suitable, any of the other features described herein:

the lighting device element further comprises at least a first locking member that has at least a first unlocked position and at least a first locked position, and the method further comprises:

moving the first locking member from the first locked position to the first unlocked position before removing the first light engine component from the lighting device element.

In some embodiments according to this aspect, which can include or not include, as suitable, any of the other features described herein:

the lighting device element further comprises at least a first locking member that has at least a first unlocked position and at least a first locked position, and the method further comprises:

moving the first locking member from the first unlocked position to the first locked position after removably supporting the second light engine component on the lighting device element.

In some embodiments according to this aspect, which can include or not include, as suitable, any of the other features described herein, the lighting device element comprises at least a first retaining structure which holds the second light engine component in place relative to the lighting device element after removably supporting the second light engine component on the lighting device element.

In some embodiments according to this aspect, which can include or not include, as suitable, any of the other features described herein, the lighting device element comprises at least one notch in which at least a portion of the second light engine component is positioned after removably supporting the second light engine component on the lighting device element.

In accordance with another aspect of the present inventive subject matter, there is provided a light engine module that comprises at least a first solid state light emitter support member and at least a first solid state light emitter mounted on the first solid state light emitter support member. The light engine module can be inserted into any of a wide variety of lighting device elements (each of which can comprise one or more lighting device components) to make a lighting device.

A number of light engine components can be made that correspond to a single design, and the light engine components can then be incorporated into a variety of different lighting device elements (some or all of which can correspond to conventional shapes and sizes, i.e., "form factors", of lighting devices) to form lighting devices that are of different shapes and/or sizes but which include similar light engine components.

Alternatively, a number of light engine components can be made that each correspond to different designs (e.g., that include different types (and/or numbers) of solid state light emitters, and/or that emit light of different hues or color temperature, and/or that emit light of different intensity, and/or that have different types of compensation circuitry), and the different components can then be incorporated into lighting device elements that correspond to a single design, to form lighting devices that are of the same shape and size (and possibly other characteristics) and which have different light engine components.

Alternatively, a number of light engine components can be made that each correspond to different designs (e.g., that include different types (and/or numbers) of solid state light emitters, and/or that emit light of different hues or color temperature, and/or that emit light of different intensity, and/or that have different types of compensation circuitry), and the different components can then be incorporated into lighting device elements that are of different shapes and/or sizes, to form lighting devices that are of different shapes and/or sizes (and possibly other characteristics) and which have different light engine components.

In addition, in accordance with this aspect of the present inventive subject matter, a number of light engine components can be provided that are of different designs (e.g., that include different types of solid state light emitters, and/or that emit light of different hues or color temperature, and/or that emit light of different intensity, and/or that have different types of compensation circuitry) and a number of lighting device elements can be provided that are of different designs (e.g., that are of different shapes and/or sizes, and/or that have other different features), and some or all of the different light engine components can be interchangeable, and some or all of the different lighting device elements can also be interchangeable, whereby the number of different designs for the overall lighting device can be as high as the product of the number of different light engine components times the number of different lighting device elements.

In accordance with an aspect of the present inventive subject matter, there are provided light engine components that can be used in the existing form factor of conventional lighting devices, e.g., any of the wide variety of form factors known to those skilled in the art, some of which are referred to herein (such as A lamps, e.g., A19 bulbs, or standard fluorescent tubes, etc.). In other words, the light engine components can be inserted into any of a wide variety of other lighting device elements to provide lighting devices that correspond to a form factor of a conventional lighting device.

In accordance with another aspect of the present inventive subject matter, there are provided light engine components that can be used to replace a light engine component contained in a lighting device of the type described in the preceding paragraph, i.e., a lighting device comprising one or more lighting device elements and a light engine component. Such replacement can be carried out in the event that a light engine component burns out or becomes less efficacious, or if different color or performance is desired.

In accordance with another aspect of the present inventive subject matter, there is provided a light engine module that comprises at least a first solid state light emitter support member and at least a first solid state light emitter.

In accordance with another aspect of the present inventive subject matter, there is provided a light engine module that comprises at least a first solid state light emitter support member and at least a first compensation circuit.

In accordance with another aspect of the present inventive subject matter, there is provided a light engine module that comprises at least a first solid state light emitter support member and at least a first solid state light emitter, with the first solid state light emitter being mounted on the first solid state light emitter support member, and at least a first region of the first solid state light emitter support member comprising a surface that has a curved cross-section. In some embodiments according to this aspect of the present inventive subject matter, at least a portion of the curved cross-section is arc-shaped (i.e., defines a portion of a circle).

In accordance with another aspect of the present inventive subject matter, there is provided a light engine module that comprises at least a first solid state light emitter support member, at least a first solid state light emitter, and at least a first compensation circuit, with the first solid state light emitter and the first compensation circuit being mounted on the first solid state light emitter support member. In some embodiments according to this aspect of the present inventive subject matter, (1) the first solid state light emitter is mounted on a first surface of the first solid state light emitter support member and the first compensation circuit is mounted on a second surface of the first solid state light emitter support member, and/or (2) the first compensation circuit comprises a temperature compensation circuit, and/or (3) the first compensation circuit comprises a color emission intensity compensation circuit.

In accordance with another aspect of the present inventive subject matter, there is provided a light engine module that comprises at least a first solid state light emitter support member, at least a first solid state light emitter, and at least a first contact element, the first solid state light emitter being mounted on a first surface of the first solid state light emitter support member, the first contact element extending at least from the first surface of the solid state light emitter support member to a second surface of the solid state light emitter support member. In some embodiments according to this aspect of the present inventive subject matter, the second surface of the solid state light emitter support member comprises a surface that has a curved cross-section (e.g., in which at least a portion of the curved cross-section is substantially arc-shaped).

In accordance with another aspect of the present inventive subject matter, there is provided a light engine module that comprises at least a first solid state light emitter support member and at least a first solid state light emitter, the first solid state light emitter being mounted on the first solid state light emitter support member, a substantial entirety of the light engine module being located on a first side of an emission plane of the first solid state light emitter, and at least 80% (and in some embodiments at least 90% or substantially all) of the light emitted by the first solid state light emitter being emitted into a second side of the emission plane of the first solid state light emitter.

In some embodiments according to the present inventive subject matter, there is provided a light engine component in which:

a first dimension of the light engine component (the first dimension being the largest dimension of the light engine component extending in a first plane parallel to the emission plane of the first solid state light emitter), is at least as large as the largest dimension of the light engine component extending in any plane that is farther from the emission plane of the first solid state light emitter than the first plane and that is parallel to the emission plane of the first solid state light emitter. In some of such embodiments, a second dimension of the light engine component is smaller than the first dimension of the light engine component, the second dimension being the largest dimension of the light engine component extending in a second plane parallel to the emission plane of the first solid state light emitter, the second plane being farther from the emission plane of the first solid state light emitter than the first plane.

In some embodiments according to the present inventive subject matter, there is provided a light engine component in which:

a first dimension of the light engine component (the first dimension extending in a first direction in a first plane parallel to the emission plane of the first solid state light emitter), is at least as large as the dimension of the light engine component extending in any direction that is parallel to the first direction and that is in a second plane, the second plane being farther from the emission plane of the first solid state light emitter than the first plane and the second plane being parallel to the emission plane of the first solid state light emitter.

In some of such embodiments, a second dimension of the light engine component is smaller than the first dimension of the light engine component, the second dimension being a dimension of the light engine component extending in the second plane parallel to the emission plane of the first solid state light emitter.

In some embodiments of the present inventive subject matter, a plurality of solid state light emitters are mounted on a first solid state light emitter support member, and substantially all of the light emitted by the plurality of solid state light emitters is emitted into a second side of an emission plane of the first solid state light emitter.

In accordance with another aspect of the present inventive subject matter, there is provided a lighting device that comprises at least one housing member, at least a first solid state light emitter support member and at least a first solid state light emitter, the first solid state light emitter being mounted on the first solid state light emitter support member, and the first solid state light emitter support member being removably supported by the at least one housing member. In some of such embodiments, the lighting device can be configured to occupy substantially the same space as an A lamp, e.g., an A19 lamp, In accordance with another aspect of the present inventive subject matter, there is provided a light engine module that comprises a first circuit board (on which one or more solid state light emitters is/are provided), a second circuit board, a first support structure, and at least a first electrical connection structure that electrically connects the first circuit board to the second circuit board, in which the creepage distance between the first electrical connection structure and at least one other electrically conductive element is increased by increasing the distance between the first electrical connection structure and the at least one other electrically conductive element along the surface of insulation that insulates the first electrical connection structure.

In accordance with another aspect of the present inventive subject matter, there is provided a light engine component that is of reduced size. In some embodiments, where the light engine component fits into a lighting device element (or elements) (e.g., a housing member, a lens and/or an electrical connector) having specific internal cross-sectional areas and shapes in planes perpendicular to and at specific locations along an axis of the lighting device element(s), the dimension of the light engine component along the axis of the lighting device element(s) is reduced.

In accordance with another aspect of the present inventive subject matter, there is provided a light engine component that can be easily placed inside and/or attached or supported within a lighting device element (or elements) (e.g., a housing member, a lens and/or an electrical connector) having specific internal cross-sectional areas and shapes in planes perpendicular to and at specific locations along an axis of the lighting device element(s).

Any embodiments of lighting devices according to the present inventive subject matter can further comprise one or more additional light sources. Persons of skill in the art are familiar with, and have ready access to, a wide variety of light emitters of different colors, and any suitable light emitters can be employed in accordance with the present inventive subject matter. Representative examples of types of light sources include incandescent lights, fluorescent lamps, solid state light emitters, laser diodes, thin film electroluminescent devices, light emitting polymers (LEPs), halogen lamps, high intensity discharge lamps, electron-stimulated luminescence lamps, etc., with or without filters. That is, the at least one light source can comprise a single light source, a plurality of light sources of a particular type, or any combination of one or more light sources of each of a plurality of types.

In accordance with another aspect of the present inventive subject matter, there is provided a lighting device element that comprises at least a first mechanical engagement region and at least a first electrical contact region, the lighting device element configured to removably support at least one light engine component with a second mechanical engagement region of the light engine component in contact with the first mechanical engagement region, and with a second electrical contact region of the light engine component in electrical contact with the first electrical contact region.

In accordance with another aspect of the present inventive subject matter, there is provided a lighting device element that comprises at least a first mechanical engagement region, at least a first electrical contact region, and means for removably supporting at least one light engine component with a second mechanical engagement region of the light engine component in contact with the first mechanical engagement region, and with a second electrical contact region of the light engine component in electrical contact with the first electrical contact region.

The inventive subject matter may be more fully understood with reference to the accompanying drawings and the following detailed description of the inventive subject matter.

BRIEF DESCRIPTION OF THE DRAWING FIGURES

Figure 2:
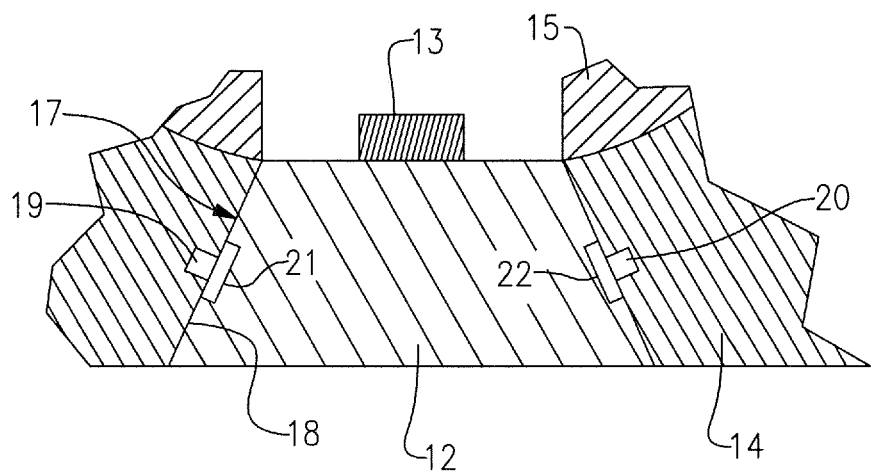
Figure 3:
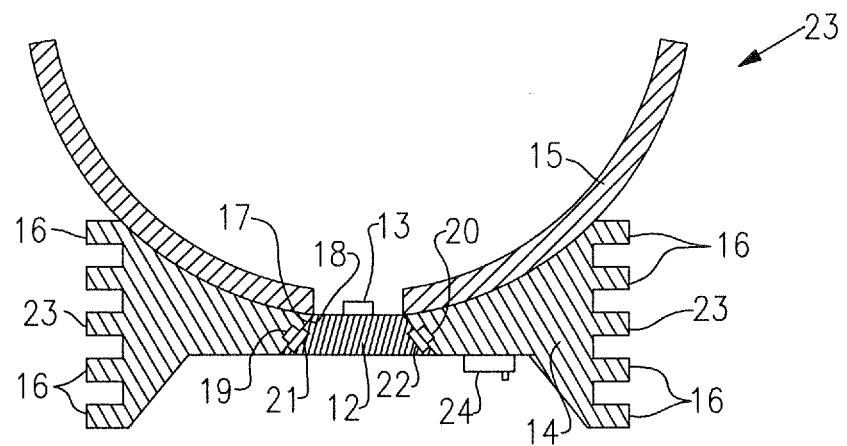
Figure 4:
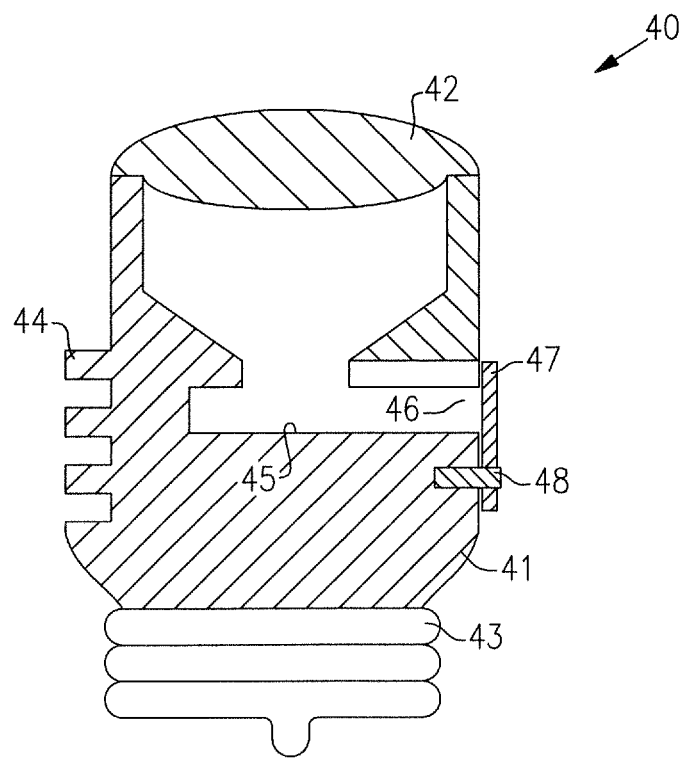
Figure 5:
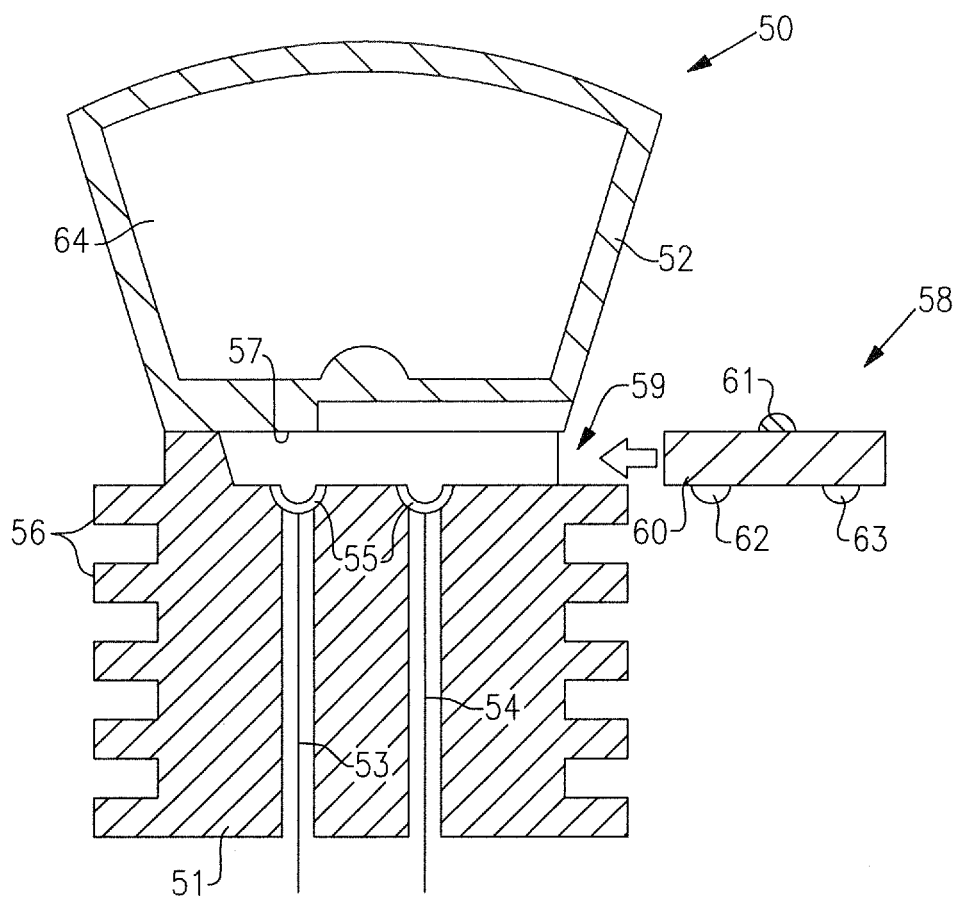
Figure 6:
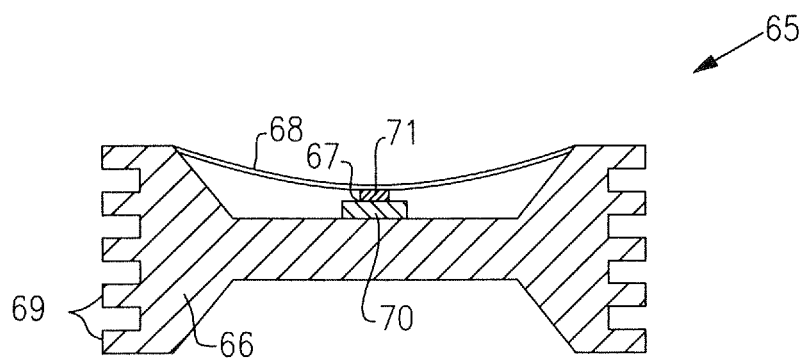
Figure 7:
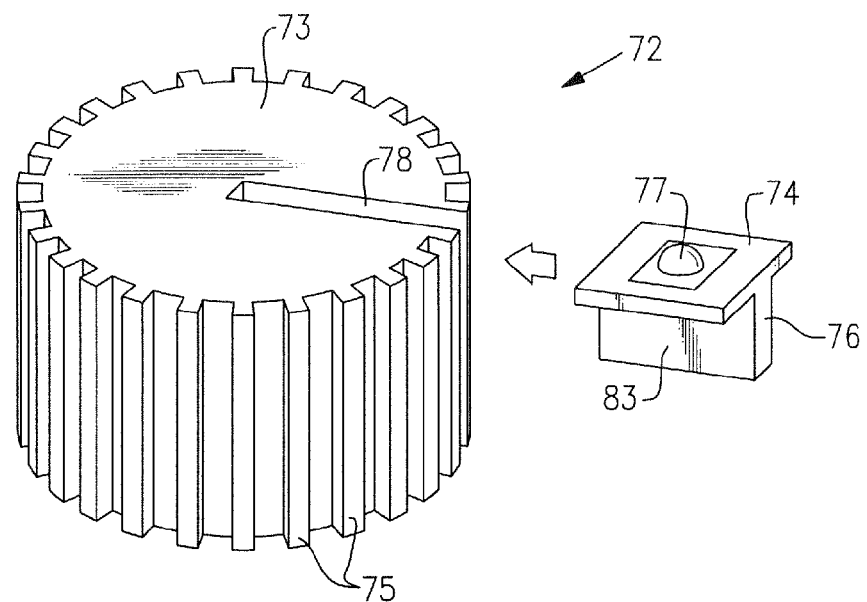
Figure 8:
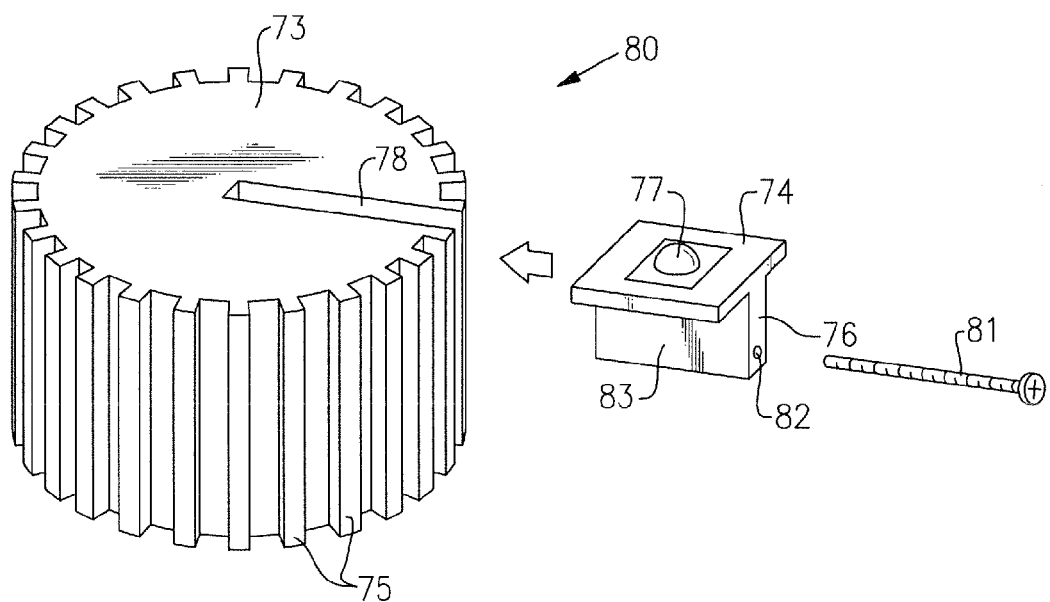
Figure 9:
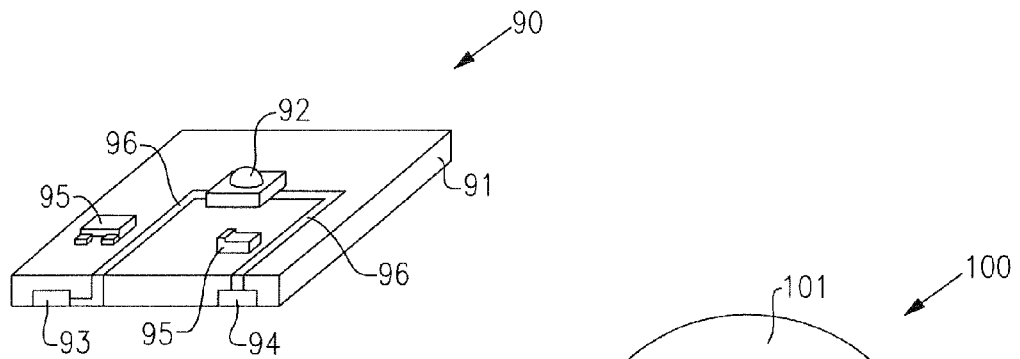
Figure 10:
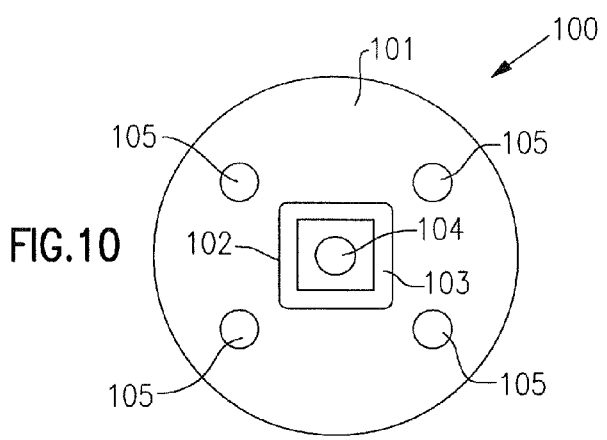
Figure 11:
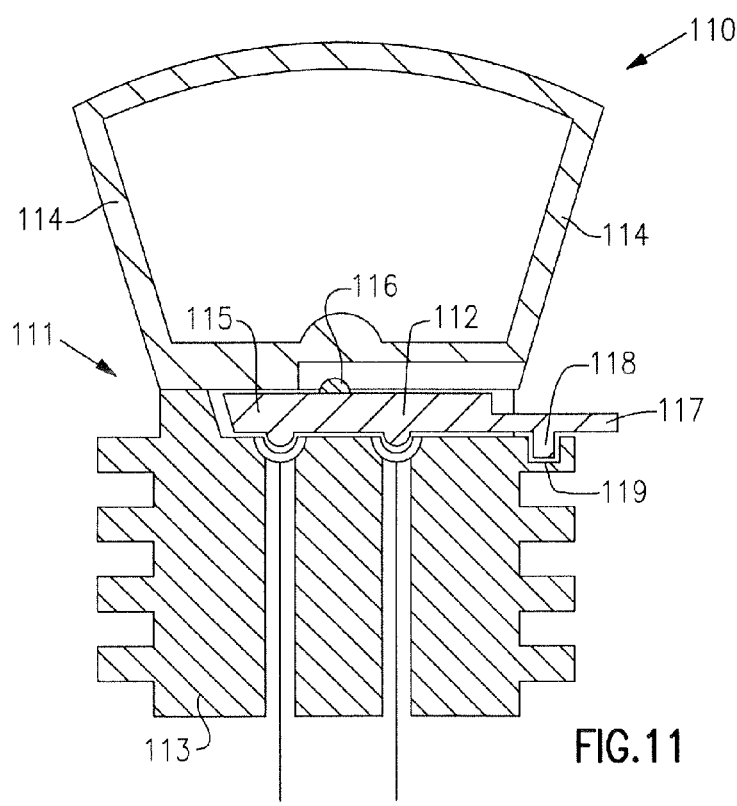
Figure 12:
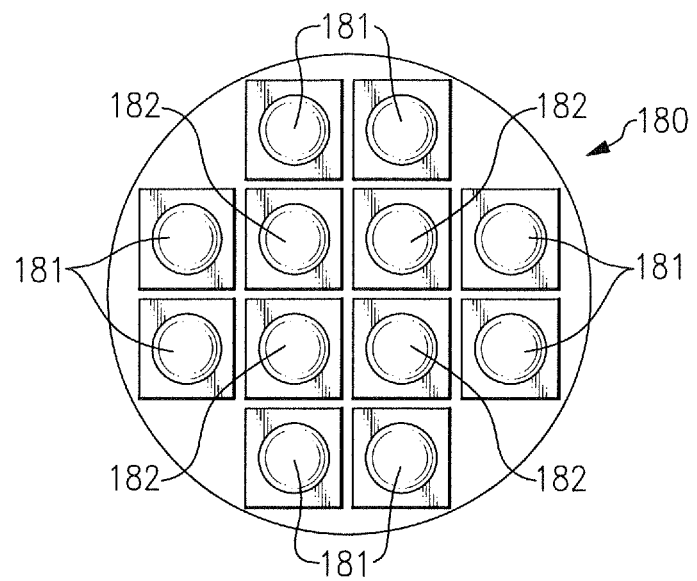
Figure 13:
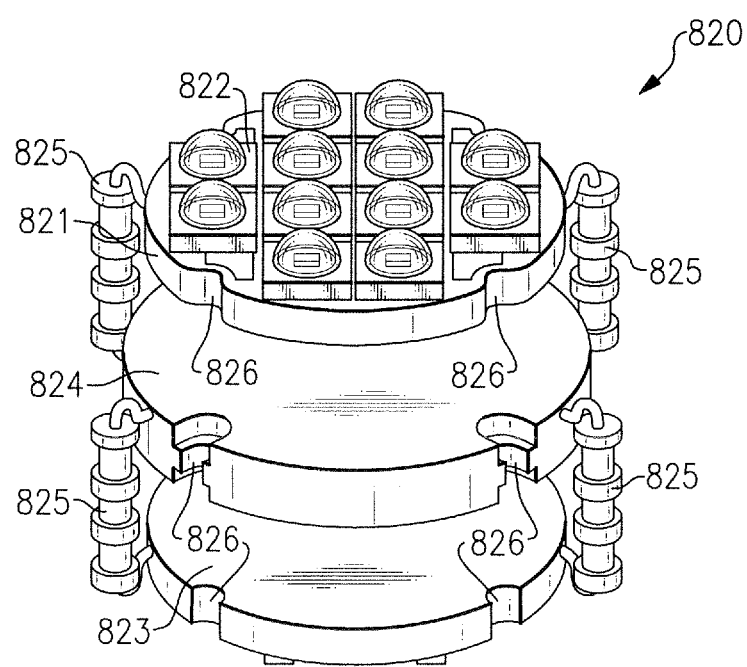
Figure 14:
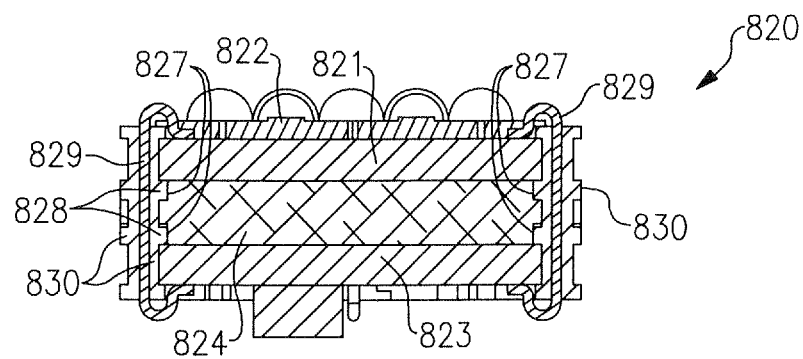
Figure 15:
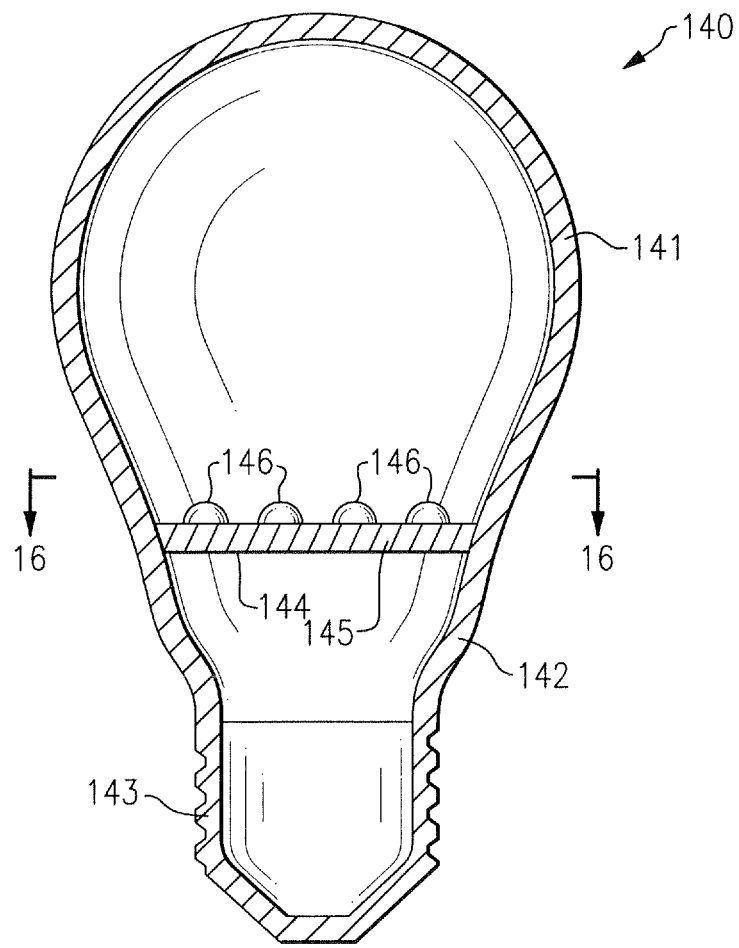
Figure 16:
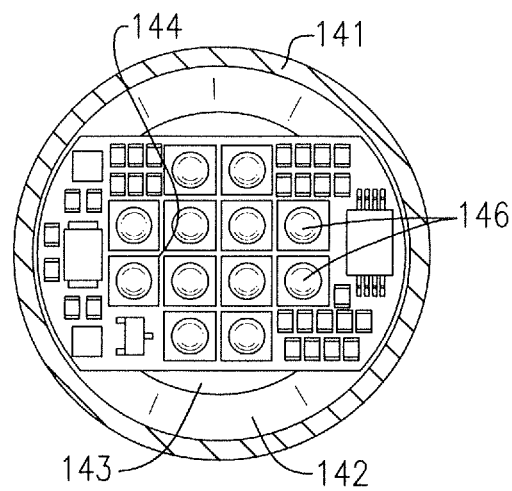
Figure 17:
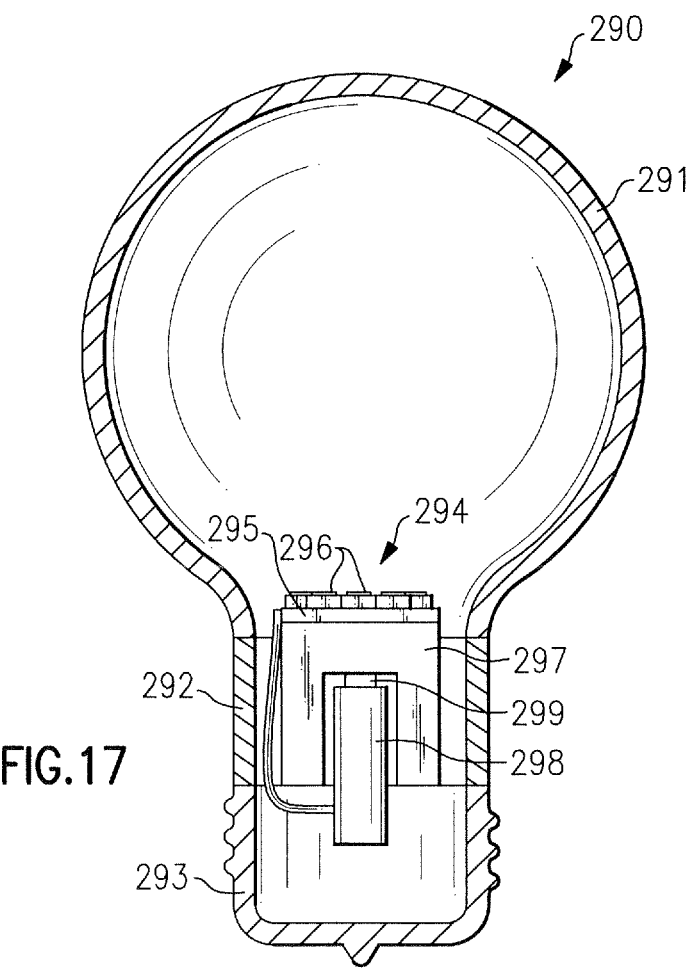
Figure 18:
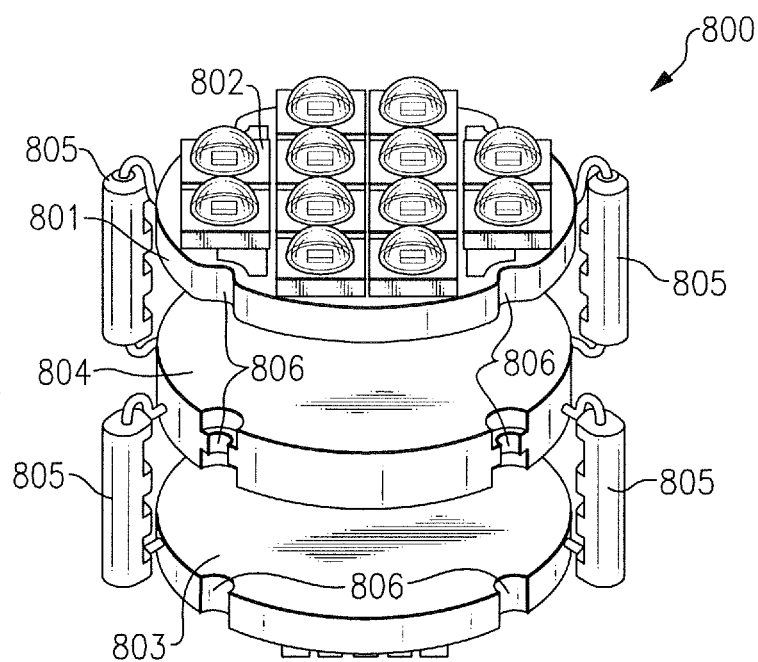
Figure 19:
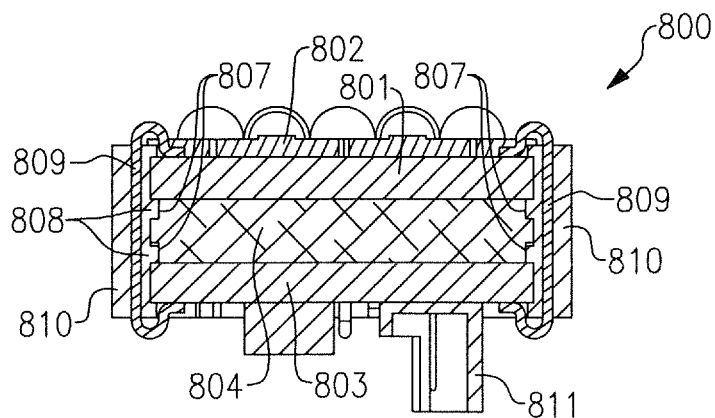
Figure 20:
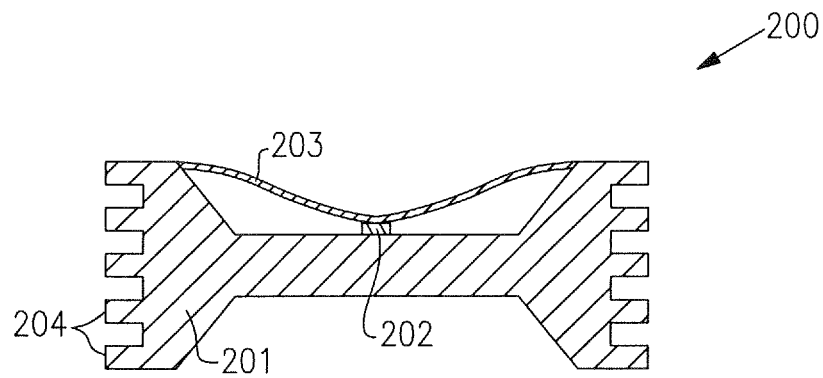
Figure 21:
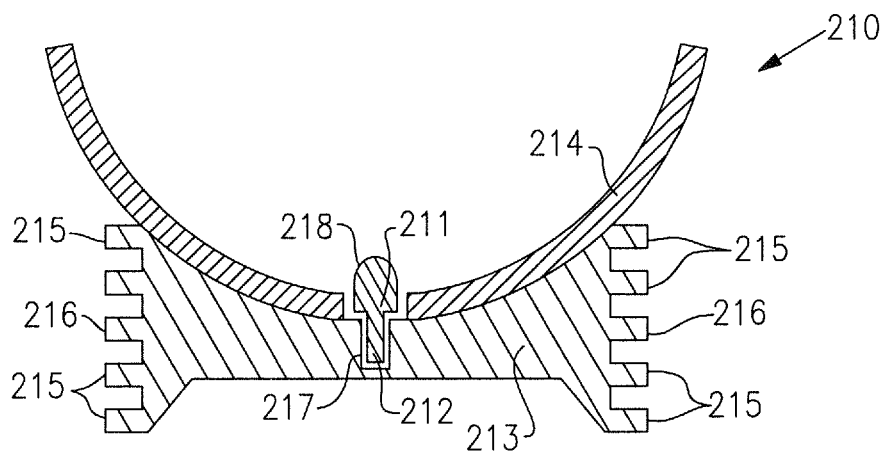
Figure 22:
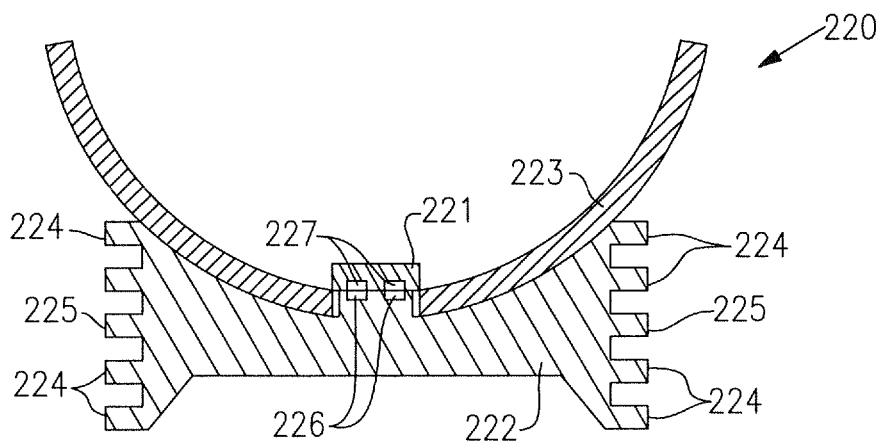

FIG. 1 is a sectional view illustrating a lighting device 10.
FIG. 2 is a close-up sectional view of a portion of the lighting device 10 depicted in FIG. 1.
FIG. 3 is a sectional view illustrating a lighting device 23.
FIG. 4 is a sectional view illustrating a lighting device element 40,
FIG. 5 is a sectional view illustrating a lighting device element 50.
FIG. 6 is a sectional view illustrating a lighting device 65,
FIG. 7 illustrates a lighting device 72.
FIG. 8 illustrates a lighting device 80.
FIG. 9 depicts a light engine module 90.
FIG. 10 is an overhead view of a lighting device 100.
FIG. 11 is a sectional view of a lighting device 110.
FIG. 12 is a schematic representation of an example of an arrangement of solid state light emitters on a solid state light emitter support member.
FIG. 13 is an exploded perspective view of a portion of a light engine module 820.
FIG. 14 is a sectional view of the light engine module 820 shown in FIG. 13.
FIG. 15 is a sectional view of a lighting device 140.
FIG. 16 is a sectional view taken along plane 16-16 shown in FIG. 15.
FIG. 17 is a cross-sectional view of a lighting device 290.
FIG. 18 is an exploded perspective view of a portion of a light engine module 800.
FIG. 19 is a sectional view of the light engine module 800 shown in FIG. 18.
FIG. 20 is a sectional view illustrating a lighting device 200.
FIG. 21 is a sectional view illustrating a lighting device 210.
FIG. 22 is a sectional view illustrating a lighting device 220.

DETAILED DESCRIPTION

The present inventive subject matter now will be described more fully hereinafter with reference to the accompanying drawings, in which embodiments of the inventive subject matter are shown. However, this inventive subject matter should not be construed as being limited to the embodiments set forth herein. Rather, these embodiments are provided so that this disclosure will be thorough and complete, and will fully convey the scope of the inventive subject matter to those skilled in the art. Like numbers refer to like elements throughout. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

When an element such as a layer, region or substrate is referred to herein as being "on", being mounted "on", being mounted "to", or extending "onto" another element, it can be in or on the other element, and/or it can be directly on the other element, and/or it can extend directly onto the other element, and it can be in direct contact or indirect contact with the other element (e.g., intervening elements may also be present). In contrast, when an element is referred to herein as being "directly on" or extending "directly onto" another element, there are no intervening elements present. Also, when an element is referred to herein as being "connected" or "coupled" to another element, it can be directly connected or coupled to the other element or intervening elements may be present. In contrast, when an element is referred to herein as being "directly connected" or "directly coupled" to another element, there are no intervening elements present. In addition, a statement that a first element is "on" a second element is synonymous with a statement that the second element is "on" the first element.

The expression "in contact with", as used herein, means that the first structure that is in contact with a second structure is in direct contact with the second structure or is in indirect contact with the second structure. The expression "in indirect contact with" means that the first structure is not in direct contact with the second structure, but that there are a plurality of structures (including the first and second structures), and each of the plurality of structures is in direct contact with at least one other of the plurality of structures (e.g., the first and second structures are in a stack and are separated by one or more intervening layers). The expression "direct contact", as used in the present specification, means that the first structure which is "in direct contact" with a second structure is touching the second structure and there are no intervening structures between the first and second structures at least at some location.

A statement herein that two components in a device are "electrically connected," means that there are no components electrically between the components that affect the function or functions provided by the device. For example, two components can be referred to as being electrically connected, even though they may have a small resistor between them which does not materially affect the function or functions provided by the device (indeed, a wire connecting two components can be thought of as a small resistor); likewise, two components can be referred to as being electrically connected, even though they may have an additional electrical component between them which allows the device to perform an additional function, while not materially affecting the function or functions provided by a device which is identical except for not including the additional component; similarly, two components which are directly connected to each other, or which are directly connected to opposite ends of a wire or a trace on a circuit board, are electrically connected. A statement herein that two components in a device are "electrically connected" is distinguishable from a statement that the two components are "directly electrically connected", which means that there are no components electrically between the two components.

Although the terms "first", "second", etc. may be used herein to describe various elements, components, regions, layers, sections and/or parameters, these elements, components, regions, layers, sections and/or parameters should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive subject matter.

Relative terms, such as "lower", "bottom", "below", "upper", "top" or "above," may be used herein to describe one element's relationship to another elements as illustrated in the Figures. Such relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompass both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

The expression "illumination" (or "illuminated"), as used herein when referring to a solid state light emitter, means that at least some current is being supplied to the solid state light emitter to cause the solid state light emitter to emit at least some electromagnetic radiation (e.g., visible light). The expression "illuminated" encompasses situations where the solid state light emitter emits electromagnetic radiation continuously, or intermittently at a rate such that a human eye would perceive it as emitting electromagnetic radiation continuously or intermittently, or where a plurality of solid state light emitters of the same color or different colors are emitting electromagnetic radiation intermittently and/or alternatingly (with or without overlap in "on" times), e.g., in such a way that a human eye would perceive them as emitting light continuously or intermittently (and, in some cases where different colors are emitted, as separate colors or as a mixture of those colors).

The expression "excited", as used herein when referring to luminescent material, means that at least some electromagnetic radiation (e.g., visible light, UV light or infrared light) is contacting the luminescent material, causing the luminescent material to emit at least some light. The expression "excited" encompasses situations where the luminescent material emits light continuously, or intermittently at a rate such that a human eye would perceive it as emitting light continuously or intermittently, or where a plurality of luminescent materials that emit light of the same color or different colors are emitting light intermittently and/or alternatingly (with or without overlap in "on" times) in such a way that a human eye would perceive them as emitting light continuously or intermittently (and, in some cases where different colors are emitted, as a mixture of those colors).

The expression "adjacent", as used herein to refer to a spatial relationship between a first structure and a second structure, means that the first and second structures are next to each other. That is, where the structures that are described as being "adjacent" to one another are similar, no other similar structure is positioned between the first structure and the second structure (for example, where two dissipation elements are adjacent to each other, no other dissipation element is positioned between them). Where the structures that are described as being "adjacent" to one another are not similar, no other structure is positioned between them.

The expression "defined (at least in part)", e.g., as used in the expression "mixing chamber is defined (at least in part) by a mixing chamber element" means that the element or feature that is defined "at least in part" by a particular structure is defined completely by that structure or is defined by that structure in combination with one or more additional structures.

The expression "lighting device", as used herein, is not limited, except that it indicates that the device is capable of emitting light. That is, a lighting device can be a device which illuminates an area or volume, e.g., a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, or a device or array of devices that illuminate an enclosure, or a device that is used for edge or back-lighting (e.g., back light poster, signage, LCD displays), bulb replacements (e.g., for replacing AC incandescent lights, low voltage lights, fluorescent lights, etc.), lights used for outdoor lighting, lights used for security lighting, lights used for exterior residential lighting (wall mounts, post/column mounts), ceiling fixtures/wall sconces, under cabinet lighting, lamps (floor and/or table and/or desk), landscape lighting, track lighting, task lighting, specialty lighting, ceiling fan lighting, archival/art display lighting, high vibration/impact lighting—work lights, etc., mirrors/vanity lighting, or any other light emitting device.

The term "removable", as used herein, means that the element (e.g., one or more light engine components) that is characterized as being removable can be removed from the lighting device without structurally changing any component in the remainder of the lighting device, e.g., a light engine component (or two or more light engine components) can be removed from the lighting device and replaced with a replacement light engine component (or two or more replacement light engine components), without soldering, gluing, cutting, fracturing, etc., so that the lighting device with the replacement light engine component(s) is structurally substantially identical to the lighting device with the previous light engine component(s) except for the light engine component(s) (or, if the replacement light engine component(s) is substantially identical to the previous light engine component(s), the entirety of the lighting device with the replacement light engine component(s) is structurally substantially identical to the entirety of the lighting device with the previous light engine component(s)).

The term "removably supported", as used herein (e.g., in the expression "light engine component being removably supported by the lighting device element" means that a first structure that is "removably supported" by a second structure is removable from the second structure.

The term "tapered", as used herein, refers to a structure that has a surface that defines cross-sectional areas (each perpendicular to a line segment) that decrease along the length of at least a portion of the line segment. For example, a tapered surface can be a surface, e.g., of a frustoconical structure (where the line segment is an axis of the frustoconical structure), a pyramidal structure (where the line segment is an axis of the pyramidal structure), although the expression "tapered" encompasses structures that are not continuously tapered (i.e., at least one portion has a substantially constant cross-sectional area) and/or that do not taper to a constant degree (e.g., where at least portions of the sides a sectional view would be curved).

The term "notch", as used herein, refers to any of a variety of shapes, e.g., a structure that can be described as including a region that has been removed from a structure (whether or not such region has actually been removed, i.e., the structure can have been constructed so as to include a notch region). For example, a notch can refer to a recess that has a depth that exceeds either dimension of its cross-section, a recess that has a depth and height that exceed its width, a region that extends from a top surface to a bottom surface and a width that is smaller than the distance from the top surface to the bottom surface, etc.

The expression "major surface" as used herein, means a surface which has a surface area which comprises at least 25% of the surface area of the entire structure, and in some cases at least 40% of the surface area of the entire structure (e.g., each of the top and bottom surfaces of a substantially flat thin element having substantially parallel top and bottom surfaces).

The word "surface", as used herein (e.g., in the expression "one or more solid state light emitters can be mounted on a first surface of a solid state light emitter support member"), encompasses regions that are flat or substantially flat, as well as regions that are not substantially flat, but for which at least 70% of the surface area of the region fits between first and second planes that are parallel to each other and are spaced from each other by a distance that is not more than 50% of a largest dimension of the region, and for which there are not two or more sub-regions within the region that (1) each comprise at least 5% of the surface area of the region, (2) at least 85% of the surface area of a first sub-region fits between third and fourth planes that are parallel to each other and are spaced from each other by a distance that is not more than 25% of a largest dimension of the first sub-region, and (3) at least 85% of the surface area of a second sub-region fits between fifth and sixth planes that (i) are parallel to each other, (ii) are spaced from each other by a distance that is not more than 25% of a largest dimension of the second sub-region, and (iii) define and angle of at least 30 degrees relative to the third and fourth planes.

The expression "substantially flat" or "substantially planar" means that at least 90% of the points in the surface which is characterized as being substantially flat are located on one of or between a pair of planes which are parallel and which are spaced from each other by a distance of not more than 5% of the largest dimension of the surface.

The expression "axis of the lighting device", as used herein, can refer to a straight line about which the lighting device is substantially symmetrical. In instances where a lighting device is not substantially symmetrical about any line, the expression "axis of the lighting device" can refer to (1) a line relative to which two or more like structures (or structures that provide like functions) on the lighting device are equidistant, (2) a line that passes through a center of gravity of the lighting device, and/or (3) a line about which rotation of the lighting device would be substantially balanced.

The expression "substantially balanced", as used herein, when referring to a structure, means that the structure is balanced or could be balanced by adding to a specific location or locations mass that in total comprises not more than about 10 percent of the mass of the structure.

The expression "surface that has a curved cross-section" means a surface through which a cross-section can be taken where at least 50% of the points in a portion of the section are spaced from a curve by a distance of not more than 10% of a maximum dimension of the surface, the curve corresponding to a circle, an ellipse, a parabola or a shape that has a single substantially constant radius of curvature or that has plural radii of curvature that all differ by not more than 50% of a curvature value, each radii of curvature being based on a sequence of points that extends at least 10% of a maximum dimension of the surface.

The expression "substantially the same space" in the expression "fit within substantially the same space that is provided for comparable conventional lighting devices" means that a first device and a second device are shaped such that the first device can be positioned such that it occupies a first device location and the second device can (at a different time) be positioned such that it occupies a second device location, wherein the first device in the first device location occupies at least 80 percent (and in some cases at least 90 percent, at least 95 percent or at least 98 or 99 percent) of the volume of the second device location, and the second device in the second device location occupies at least 80 percent (and in some cases at least 90 percent, at least 95 percent or at least 98 or 99 percent) of the volume of the first device location.

The expression "emission plane of a solid state light emitter," (e.g., "an emission plane of the first solid state light emitter"), as used herein, means (1) a plane that is perpendicular to an axis of the light emission from the solid state light emitter (e.g., in a case where light emission is hemispherical, the plane would be along the flat part of the hemisphere; in a case where light emission is conical, the plane would be perpendicular to the axis of the cone), (2) a plane that is perpendicular to a direction of maximum intensity of light emission from the solid state light emitter (e.g., in a case where the maximum light emission is vertical, the plane would be horizontal), (3) a plane that is perpendicular to a mean direction of light emission (in other words, if the maximum intensity is in a first direction, but an intensity in a second direction ten degrees to one side of the first direction is larger than an intensity in a third direction ten degrees to an opposite side of the first direction, the mean intensity would be moved somewhat toward the second direction as a result of the intensities in the second direction and the third direction).

The expression "substantially all" in the expression "substantially all of the light emitted by the plurality of solid state light emitters is emitted into the second side of the emission plane of the first solid state light emitter" means at least 98 percent of the light.

The expression "substantially perpendicular", as used herein, means that at least 90% of the points in the structure which is characterized as being substantially perpendicular to a reference plane or line are located on one of or between a pair of planes (1) which are perpendicular to the reference plane, (2) which are parallel to each other and (3) which are spaced from each other by a distance of not more than 5% of the largest dimension of the structure.

The term "exposed", as used herein (e.g., in the expression "at least a portion of the opening being exposed to the first lens"), means that a first structure or region that is "exposed" to a second structure or region is located relative to the second structure such that light could be emitted from at least one point on the first structure or region and in a direction whereby such light would reach at least one point on the second structure or region.

The expression "substantially transparent", as used herein, means that at least 90% of the structure which is characterized as being substantially transparent allows passage of at least 80% of incident visible light, and/or at least 80% of the light having a wavelength within the range emitted by the one or more light emitters included in the lighting device.

The present inventive subject matter further relates to an illuminated enclosure (the volume of which can be illuminated uniformly or non-uniformly), comprising an enclosed space and at least one lighting device according to the present inventive subject matter, wherein the lighting device illuminates at least a portion of the enclosed space (uniformly or non-uniformly).

Some embodiments of the present inventive subject matter comprise at least a first power line, and some embodiments of the present inventive subject matter are directed to a structure comprising a surface and at least one lighting device corresponding to any embodiment of a lighting device according to the present inventive subject matter as described herein, wherein if current is supplied to the first power line, and/or if at least one solid state light emitter in the lighting device is illuminated, the lighting device would illuminate at least a portion of the surface.

The present inventive subject matter is further directed to an illuminated area, comprising at least one item, e.g., selected from among the group consisting of a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, etc., having mounted therein or thereon at least one lighting device as described herein.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein. It will also be appreciated by those of skill in the art that references to a structure or feature that is disposed "adjacent" another feature may have portions that overlap or underlie the adjacent feature.

As noted above, in some aspects, the present inventive subject matter is directed to lighting devices that comprise light engine components and to methods that comprise removing a first light engine component from a lighting device element and removably supporting a second light engine component on the lighting device element. A light engine component can be one or more solid state light emitters, one or more packaged solid state light emitters or a light engine module.

Light engine components according to the present inventive subject matter can be configured to emit (when supplied with electricity) light of any color or hue. For example, in some embodiments, light engine components can emit white light, i.e., they can include light emitters (e.g., solid state light emitters, such as light emitting diodes and/or luminescent material) which emit light that, when blended, mix to produce light that is perceived as white light. Alternatively, in some embodiments, light engine components can emit light that is blue, green, yellow, orange, red, or any other color or hue.

The following discussion of solid state light emitters applies to the solid state light emitters that can be included in any of the light engine components or lighting devices according to the present inventive subject matter.

Persons of skill in the art are familiar with, and have ready access to, a wide variety of solid state light emitters, and any suitable solid state light emitter (or solid state light emitters) can be employed in the light engine components or lighting devices according to the present inventive subject matter. Representative examples of solid state light emitters include light emitting diodes (inorganic or organic, including polymer light emitting diodes (PLEDs)) with or without luminescent materials.

Persons of skill in the art are familiar with, and have ready access to, a variety of solid state light emitters that emit light having a desired peak emission wavelength and/or dominant emission wavelength, and any of such solid state light emitters (discussed in more detail below), or any combinations of such solid state light emitters, can be employed in embodiments that comprise a solid state light emitter.

Light emitting diodes are semiconductor devices that convert electrical current into light. A wide variety of light emitting diodes are used in increasingly diverse fields for an ever-expanding range of purposes. More specifically, light emitting diodes are semiconducting devices that emit light (ultraviolet, visible, or infrared) when a potential difference is applied across a p-n junction structure. There are a number of well known ways to make light emitting diodes and many associated structures, and the present inventive subject matter can employ any such devices.

A light emitting diode produces light by exciting electrons across the band gap between a conduction band and a valence band of a semiconductor active (light-emitting) layer. The electron transition generates light at a wavelength that depends on the band gap. Thus, the color of the light (wavelength) and/or the type of electromagnetic radiation (e.g., infrared light, visible light, ultraviolet light, near ultraviolet light, etc., and any combinations thereof) emitted by a light emitting diode depends on the semiconductor materials of the active layers of the light emitting diode.

The expression "light emitting diode" is used herein to refer to the basic semiconductor diode structure (i.e., the chip). The commonly recognized and commercially available "LED" that is sold (for example) in electronics stores typically represents a "packaged" device made up of a number of parts. These packaged devices typically include a semiconductor-based light emitting diode such as (but not limited to) those described in U.S. Pat. Nos. 4,918,487; 5,631,190; and 5,912,477; various wire connections, and a package that encapsulates the light emitting diode.

Solid state light emitters according to the present inventive subject matter can, if desired, comprise one or more luminescent materials.

A luminescent material is a material that emits a responsive radiation (e.g., visible light) when excited by a source of exciting radiation. In many instances, the responsive radiation has a wavelength that is different from the wavelength of the exciting radiation.

Luminescent materials can be categorized as being down-converting, i.e., a material that converts photons to a lower energy level (longer wavelength) or up-converting, i.e., a material that converts photons to a higher energy level (shorter wavelength).

One type of luminescent material are phosphors, which are readily available and well known to persons of skill in the art. Other examples of luminescent materials include scintillators, day glow tapes and inks that glow in the visible spectrum upon illumination with ultraviolet light.

Persons of skill in the art are familiar with, and have ready access to, a variety of luminescent materials that emit light having a desired peak emission wavelength and/or dominant emission wavelength, or a desired hue, and any of such luminescent materials, or any combinations of such luminescent materials, can be employed, if desired.

The one or more luminescent materials can be provided in any suitable form. For example, the luminescent element can be embedded in a resin (i.e., a polymeric matrix), such as a silicone material, an epoxy material, a glass material or a metal oxide material, and/or can be applied to one or more surfaces of a resin, to provide a lumiphor.

A solid state lighting device (or devices), e.g., one or more light emitting diodes, used in a lighting device according to the present inventive subject matter can be of any suitable size (or sizes).

In general, light of any number of colors can be mixed by the lighting devices according to the present inventive subject matter.

Some embodiments according to the present inventive subject matter provide a light engine component that comprises at least one solid state light emitter that, if energized, emits BSY light, and at least one solid state light emitter that, if energized, emits light that is not BSY light.

The expression "BSY light", as used herein, means light having x, y color coordinates which define a point which is within (1) an area on a 1931 CIE Chromaticity Diagram enclosed by first, second, third, fourth and fifth line segments, said first line segment connecting a first point to a second point, said second line segment connecting said second point to a third point, said third line segment connecting said third point to a fourth point, said fourth line segment connecting said fourth point to a fifth point, and said fifth line segment connecting said fifth point to said first point, said first point having x, y coordinates of 0.32, 0.40, said second point having x, y coordinates of 0.36, 0.48, said third point having x, y coordinates of 0.43, 0.45, said fourth point having x, y coordinates of 0.42, 0.42, and said fifth point having x, y coordinates of 0.36, 0.38, and/or (2) an area on a 1931 CIE Chromaticity Diagram enclosed by first, second, third, fourth and fifth line segments, the first line segment connecting a first point to a second point, the second line segment connecting the second point to a third point, the third line segment connecting the third point to a fourth point, the fourth line segment connecting the fourth point to a fifth point, and the fifth line segment connecting the fifth point to the first point, the first point having x, y coordinates of 0.29, 0.36, the second point having x, y coordinates of 0.32, 0.35, the third point having x, y coordinates of 0.41, 0.43, the fourth point having x, y coordinates of 0.44, 0.49, and the fifth point having x, y coordinates of 0.38, 0.53.

Lighting devices (and/or light engine components) according to the present inventive subject matter can comprise any desired number of solid state light emitters (and/or any amount of luminescent material or number of luminphors). For example, a lighting device according to the present inventive subject matter can include 50 or more light emitting diodes, or can include 100 or more light emitting diodes, etc. Other embodiments may include fewer light emitting diodes, and such could be small chip light emitting diodes or high power light emitting diodes.

The one or more solid state light emitters can be arranged in any suitable way.

Some embodiments according to the present inventive subject matter can include solid state light emitters that emit light of a first hue (e.g., light within the BSY range) and solid state light emitters that emit light of a second hue (e.g., that is not within the BSY range, such as red or reddish or reddish orange or orangish, or orange light), where each of the solid state light emitters that emit light that is not BSY light is surrounded by five or six solid state light emitters that emit BSY light.

Some embodiments according to the present inventive subject matter comprise a first group of one or more solid state light emitters that, if energized, emit BSY light, and a second group of one or more solid state light emitters that, if energized, emit light that is not BSY light, the first and second groups of light emitting diodes are mounted on a first solid state light emitter support member, and an average distance between a center of each solid state light emitter in the first group and a closest point on an edge region of the first solid state light emitter support member is smaller than an average distance between a center of each solid state light emitter in the second group and a closest point on an edge region of the first solid state light emitter support member.

In some embodiments, solid state light emitters (e.g., where a first group includes solid state light emitters that emit non-BSY light, e.g., red, reddish, reddish-orange, orangish or orange light, and a second group includes solid state light emitters that emit BSY light) may be arranged pursuant to a guideline described below in paragraphs (1)-(5), or any combination of two or more thereof, to promote mixing of light from solid state light emitters emitting different colors of light:

(1) an array that has groups of first and second solid state light emitters with the first group of solid state light emitters arranged so that no two of the first group solid state light emitters are directly next to one another in the array;

(2) an array that comprises a first group of solid state light emitters and one or more additional groups of solid state light emitters, the first group of solid state light emitters being arranged so that at least three solid state light emitters from the one or more additional groups is adjacent to each of the solid state light emitters in the first group;

(3) an array that comprises a first group of solid state light emitters and one or more additional groups of solid state light emitters, and the array is arranged so that less than fifty percent (50%), or as few as possible, of the solid state light emitters in the first group of solid state light emitters are on the perimeter of the array;

(4) an array that comprises a first group of solid state light emitters and one or more additional groups of solid state light emitters, and the first group of solid state light emitters is arranged so that no two solid state light emitters from the first group are directly next to one another in the array, and so that at least three solid state light emitters from the one or more additional groups is adjacent to each of the solid state light emitters in the first group; and/or (5) an array that is arranged so that no two solid state light emitters from the first group are directly next to one another in the array, fewer than fifty percent (50%) of the solid state light emitters in the first group of solid state light emitters are on the perimeter of the array, and at least three solid state light emitters from the one or more additional groups are adjacent to each of the solid state light emitters in the first group.

Arrays according to the present inventive subject matter can also be arranged other ways, and can have additional features, that promote color mixing. In some embodiments, solid state light emitters can be arranged so that they are tightly packed, which can further promote natural color mixing. The lighting device can also comprise different diffusers and reflectors to promote color mixing in the near field and in the far field.

Solid state light emitters can be mounted on solid state light emitter support members in any suitable way, e.g., by using chip on heat sink mounting techniques, by soldering (e.g., if the solid state light emitter support member comprises a metal core printed circuit board (MCPCB), flex circuit or even a standard PCB, such as an FR4 board), for example, solid state light emitters can be mounted using substrate techniques such as from Thermastrate Ltd of Northumberland, UK. If desired, the surface of a solid state light emitter support member and/or the one or more solid state light emitters can be machined or otherwise formed to be of matching topography so as to provide high heat sink surface area.

The following discussion of solid state light emitter support members applies to solid state light emitter support members that can be included in any of the light engine components or lighting devices according to the present inventive subject matter.

A solid state light emitter support member (or members) can be made of any suitable material (or combination of materials), and persons of skill in the art are familiar with a variety of suitable materials. For example, in some embodiments, one or more support structures can be made of any suitable material that has relatively high heat conductivity, e.g., aluminum, copper. aluminum nitride (AlN), silicon carbide (SiC), diamond-like carbon (DLC), etc. In light engine modules or lighting devices that include two or more solid state light emitter support members, the respective solid state light emitter support members can be made of the same material or combination of materials, or any one or more of the respective solid state light emitter support members can be made of different materials (or combinations of materials).

A solid state light emitter support member (or members) can be of any suitable shape and/or size. In some embodiments, which can include or not include, as suitable, any of the other features described herein, a solid state light emitter support member can have first and second major surfaces, and one or more edge regions. In some embodiments, such first and second major surfaces can be substantially planar and substantially parallel to each other. In some embodiments, such first and second major surfaces can be substantially planar and substantially parallel to each other, and at least one edge region can extend from the first major surface to the second major surface substantially perpendicularly to each of the first and second major surfaces at least partway around a periphery of the solid state light emitter support member (or, a plurality of edge regions can extend from the first major surface to the second major surface substantially perpendicularly to each of the first and second major surfaces at least partway around a periphery of the solid state light emitter support member).

In some embodiments, which can include or not include, as suitable, any of the other features described herein, a solid state light emitter support member can comprise a circuit board (or can consist of a circuit board), can comprise one or more electrically conductive tracks (or other electrically conductive regions), and/or can comprise one or more circuitry components. For example, in some embodiments, a solid state light emitter support member can be a submount (or can comprise a submount), i.e., a structure that includes one or more electrically conductive regions that provide electrical connection between other electrically conductive regions and/or circuitry components in the lighting device element.

In some embodiments, which can include or not include, as suitable, any of the other features described herein, all of the solid state light emitters in the lighting device can be mounted on a single surface of a solid state light emitter support member.

In some embodiments, which can include or not include, as suitable, any of the other features described herein, at least one solid state light emitter can be mounted on one surface of a solid state light emitter support member, and at least one compensation circuit (discussed in more detail below) can be mounted on a second surface of the solid state light emitter support member. In some of such embodiments, the first and second surfaces of the solid state light emitter support member can be on opposite sides of the solid state light emitter support member, e.g., the first and second surfaces of the solid state light emitter support member can each be substantially planar and substantially parallel to each other.

As noted above, in some embodiments according to the present inventive subject matter, there are provided lighting devices that comprise a lighting device element comprising at least a first electrical contact region and at least a first light engine module comprising at least a second electrical contact region, the first electrical contact region being in electrical contact with the second electrical contact region, and in some aspects of the present inventive subject matter, there are provided lighting device elements that comprise at least a first housing member that comprises at least a first electrical contact region. In such embodiments, which can include or not include, as suitable, any of the other features described herein, the electrical contact region (or regions) can comprise any suitable structure(s) for providing electrical contact, a wide variety of which are well known to persons of skill in the art. In some of such embodiments, electrical contact regions can be provided at respective locations on a light engine module and on a lighting device element (to be used together) such that if the light engine module is mounted on the lighting device element with a second mechanical engagement region of the light engine module in contact with a first mechanical engagement region of the lighting device element (i.e., so that the light engine module is removably supported by the lighting device element), a second electrical contact region (of the light engine module) will be in electrical contact with a first electrical contact region (of the lighting device element)(i.e., in such embodiments, by mounting the light engine module on the lighting device element, mechanical and electrical connection are provided.

The following discussion of electrical contact regions applies to electrical contact regions that can be provided in any of the light engine components or lighting devices according to the present inventive subject matter.

Persons of skill in the art are familiar with a wide variety of electrical contact regions, and any of such electrical contact regions can be employed in accordance with the present inventive subject matter. Electrical contact regions can be made of any suitable electrically conductive material (or combinations of materials), a wide variety of which are well known to persons skilled in the art. Electrical contact regions can be of any suitable size and shape, a variety of which are well known to those of skill in the art. For instance, an electrical contact region can comprise a portion of an element or can be a separate electrical contact element, and can comprise a substantially flat or curved region or element, which can be generally circular, square, rectangular, etc. A contact region or element can be in the shape of a helical spring, a leaf spring, or any other suitable shape.

In some embodiments, which can include or not include, as suitable, any of the other features described herein, one or more electrical contact regions can be provided on a light engine component (e.g., in the form of one or more electrical contact elements mounted on the light engine component). In some of such embodiments, at least a portion of such an electrical contact region, e.g., a contact, spring element, trace, wire bond, etc. (or at least one of a plurality of electrical contact regions), can be exposed on at least one surface of the light engine component (e.g., on a solid state light emitter support member, e.g., on one or more major surfaces of a solid state light emitter support member and/or on an edge region of a solid state light emitter support member (which edge region can, for example, extend between first and second major substantially planar and substantially parallel surfaces of the solid state light emitter support member)) and can come into contact with a corresponding electrical contact region, e.g., a contact, spring element, trace, wire bond, etc. (or with a plurality of electrical contact regions or a respective plurality of electrical contact regions), on a lighting device element (e.g., a housing member), whereby electricity can be supplied from the electrical contact region (or regions) on the lighting device element to the electrical contact region (or regions) on the light engine component (and then, e.g., to circuitry which can ultimately supply electricity to one or more solid state light emitters). In some cases, such an electrical contact element can wrap around and be present on another surface of a solid state light emitter support member.

In some embodiments, which can include or not include, as suitable, any of the other features described herein, a light engine component (e.g., a solid state light emitter support member or at least one of plural solid state light emitter support members) can comprise one or more electrical contact regions that supply electricity to one or more solid state light emitters, and optionally to other circuitry, as suitable. For instance, in some of such embodiments, a solid state light emitter support member can be a circuit board (or can comprise a circuit board).

In some embodiments, which can include or not include, as suitable, any of the other features described herein, a solid state light emitter support member (or at least one of plural solid state light emitter support members) can comprise a circuit board (e.g., a metal core circuit board) (in some embodiments, a solid state light emitter support member can consist essentially of a circuit board) on which a solid state light emitter (or at least one of plural solid state light emitters) can be mounted, and optionally other circuitry (e.g., one or more compensation circuits) can be mounted (on the same surface and/or on different surface, e.g., on opposite sides).

As noted above, in one aspect of the present inventive subject matter, there is provided a lighting device that comprises at least one light engine component that is removably supported by at least one lighting device element, a first mechanical engagement region (or the lighting device element) being in contact with a second mechanical engagement region (of the light engine component). Persons of skill in the art are familiar with a wide variety of structures (i.e., mechanical engagement regions) by which a light engine component can be removably supported by a lighting device element, and any of such structures can be employed in accordance with the present inventive subject matter.

A light engine component (or components) can be removably held in place relative to a lighting device element in any suitable way, a wide variety of which will be readily apparent to persons skilled in the art. A light engine component (or components) can be held in place relative to any suitable lighting device element (e.g., a housing member) included in a lighting device. For instance, a light engine component can be held in place relative to a lighting device element (e.g., a housing member) (1) by providing threads on an edge surface of the light engine component which can be threadedly engaged in corresponding threads provided in the interior of a housing member, (2) by providing a clip (or clips) on the light engine component which engages a housing member, and/or by providing a clip (or clips) on a housing member which engage the light engine component, (3) by providing a pin (or pins) on the light engine component which fits into a recess (or recesses) provided on a housing member, and/or by providing a pin (or pins) on a housing member which fits into a recess (or recesses) provided on the light engine component, (4) using screws, bolts, rivets, etc. that extend through at least a portion of a housing member and at least a portion of the light engine component, (5) using adhesive, (6) through geometry (e.g., a tapered surface, e.g., an external frustoconical surface, on the light engine component engages a tapered surface, e.g., an internal frustoconical surface, on a housing member, or at least a portion of the light engine component fits into a cavity formed in a housing member, etc.).

For example, in some embodiments, there can be provided a lighting device element which comprises at least a first housing member that has at least a first cavity in which at least a portion of the first light engine component is located, and the first mechanical engagement region is on a surface inside the first cavity. In such embodiments, as suitable, there can be provided notches, bumps, clips, screws, springs, bolts/nuts etc. to further assist in removably holding the light engine component in place relative to the lighting device element.

In some embodiments, there can be provided other geometrical features which serve to hold a light engine component in place relative to a lighting device element, e.g., the lighting device element can comprise a first mechanical engagement region which is substantially tapered (e.g., which is substantially frustoconical) and the light engine component can comprise a second mechanical engagement region which is correspondingly substantially tapered. In such embodiments, as suitable, there can be provided notches, bumps, clips, screws, springs, bolts/nuts etc. to further assist in removably holding the light engine component in place relative to the lighting device element.

In some embodiments, there can be provided one or more retaining structures (e.g., clips, helical springs, leaf springs, screws, bolts/nuts, weights etc.) which removably hold the first light engine component in place relative to the lighting device element. In such embodiments, as suitable, there can be provided notches, bumps, additional clips, additional screws, additional springs, additional bolts/nuts etc. to further assist in removably holding the light engine component in place relative to the lighting device element.

In some embodiments, one or more light engine components can be removed from a lighting device element without the need for any tools (e.g., a screwdriver, a socket wrench or an Allen wrench), or that require the use of one or more tools for removal of the light engine component (or one or more of plural components).

In some embodiments, the effects of volumetric expansion/contraction with temperature change can be employed in order to enable a light engine component (or components) to be more easily removed from or removably attached to a lighting device element (or elements), e.g., a lighting device (or at least a light engine component) can be cooled in order to be of smaller volume in order to make removal or mounting easier.

In some embodiments, there can be provided one or more locking members that have at least a first unlocked position and at least a first locked position and that hold a light engine component in place relative to a lighting device element (if in the first locked position), and that do not hold the first light engine component in place relative to the lighting device element (if in the first unlocked position, i.e., that can be moved in order to release the light engine component for removal). A locking member can be in any of a wide variety of forms, e.g., in the form of a clip, a spring, a rotatable structure, etc.

The following discussion of housing members applies to the housing members that can be included in any of the lighting devices according to the present inventive subject matter.

A housing member can be of any suitable shape and size, and can be made of any suitable material or materials. Persons of skill in the art are familiar with, and can envision, a wide variety of materials out of which a housing can be constructed (for example, a metal, a ceramic material, a plastic material with low thermal resistance, or combinations thereof), and a wide variety of shapes for such housings, and housings made of any of such materials and having any of such shapes can be employed in accordance with the present inventive subject matter.

In some embodiments, a housing member can comprise one or more heat dissipation regions, e.g., one or more heat dissipation fins and/or one or more heat dissipation pins, or any other structure that provides or enhances any suitable thermal management scheme.

In embodiments in which a solid state light emitter support comprises one or more support structures, the support structure (or at least one of the plural support structures) can function as a heat sink and/or as a heat dissipation structure.

In some embodiments, a housing member and a mixing chamber element are integral.

In some embodiments, a housing member is shaped so that it can accommodate one or more solid state light emitter support member, as well as any of a variety of light engine modules involved in receiving current supplied to a lighting device, modifying the current (e.g., converting it from AC to DC and/or from one voltage to another voltage), and/or driving one or more solid state light emitters (e.g., illuminating one or more solid state light emitter intermittently and/or adjusting the current supplied to one or more solid state light emitters in response to a detected operating temperature of one or more solid state light emitter, a detected change in intensity or color of light output, a detected change in an ambient characteristic such as temperature or background light, a user command, etc., and/or a signal contained in the input power, such as a dimming signal in AC power supplied to the lighting device).

Lighting devices or lighting device elements according to the present inventive subject matter can comprise one or more electrical connectors.

Various types of electrical connectors are well known to those skilled in the art, and any of such electrical connectors can be attached within (or attached to) the lighting devices (or lighting device elements) according to the present inventive subject matter. Representative examples of suitable types of electrical connectors include wires (for splicing to a branch circuit), Edison plugs (i.e., Edison screw threads, which are receivable in Edison sockets) and GU24 pins (which are receivable in GU24 sockets). Other well known types of electrical connectors include 2-pin (round) GX5.3, can DC bay, 2-pin GY6.35, recessed single contact R7s, screw terminals, 4 inch leads, 1 inch ribbon leads, 6 inch flex leads, 2-pin GU4, 2-pin GU5.3, 2-pin G4, turn & lock GU7, GU10, G8, G9, 2-pin Pf, min screw E10, DC bay BA15d, min cand E11, med screw E26, mog screw E39, mogul bipost G38, ext. mog end pr GX16d, mod end pr GX16d and med skirted E26/50x39 (see https://www.gecatalogs.com/lighting/software/GELightingCatalogSetup.exe).

In some embodiments, an electrical connector is attached to at least one housing member. In some embodiments of lighting devices (or lighting device elements) in accordance with the present inventive subject matter, the lighting device comprises one or more lenses, one or more housing members, one or more electrical connectors and one or more light engine components, with the light engine component(s) positioned within the housing member(s), and with the lens(es) and the electrical connector(s) attached to opposite ends of the housing member(s), whereby the form factor of the lighting device is similar to a conventional lighting device, e.g., an A lamp (whereby the lighting device according to the present inventive subject matter can be screwed into a socket designed to accommodate an A lamp or from which an A lamp has been removed). In some embodiments that comprise one or more support structures, the support structure (or one or more of the plural support structures) can comprise one or more electrical connectors, or can be attached to one or more electrical connectors.

An electrical connector, if included, can be electrically connected to one or more circuitry component, e.g., a power supply, an electrical contact region or element, a first circuit board (on which a plurality of solid state light emitters are mounted), and/or a second circuit board (on which at least one compensation circuit is mounted) included in the lighting device (or lighting device element) in any suitable way. Representative examples of ways to electrically connect a circuitry component to an electrical connector include providing one or more electrical contact regions and/or elements, connecting a first portion of a flexible wire to the electrical connector and connecting a second portion of the flexible wire to a circuit board (e.g., a metal core circuit board) on which one or more circuitry components is mounted, providing one or more pins, insulated wires, ribbon cables, solder, conductive clips, wire bonds, spring contacts, or any combination of any of the above.

An electrical connector, if included, can be attached to one or more other components of the lighting device (or lighting device element) in any suitable way, e.g., by screw-threading into another component (e.g., a housing member, if included, or a lens, if included), with screws (or bolts or rivets), with clips, with adhesive (e.g., thermal paste), by compression, by press fitting, by a ridge and groove, or by an arrangement in which a tab on one element fits into a slot on the other element and then the elements are moved relative to one another (e.g., one element is slid or rotated relative to the other).

Light engine components according to the present inventive subject matter can be incorporated into any suitable lighting device elements, a wide variety of which are known to those of skill in the art.

In some embodiments, which can include or not include, as suitable, any of the other features described herein, a sensor (e.g., a color sensor and/or a temperature sensor, such as a thermistor) can be positioned in any suitable location.

The following discussion of color sensors applies to color sensors that can be included in any of the light engine components or lighting devices according to the present inventive subject matter.

Persons of skill in the art are familiar with a wide variety of color sensors, and any of such sensors can be employed in the lighting devices of the present inventive subject matter. Among these well known sensors are sensors that are sensitive to all visible light, as well as sensors that are sensitive to only a portion of visible light. For example, the sensor can be a unique and inexpensive sensor (GaP:N light emitting diode) that views the entire light flux but is only (optically) sensitive to one or more of a plurality of light emitting diodes. For instance, in one specific example, the sensor can be sensitive to only a particular range (or ranges) of wavelengths, and the sensor can provide feedback to one or more light sources (e.g., light emitting diodes that emit light of that color or that emit light of other colors) for color consistency as the light sources age (and light output decreases). By using a sensor that monitors output selectively (by color), the output of one color can be selectively controlled to maintain the proper ratios of outputs and thereby maintain the color output of the device. This type of sensor is excited by only light having wavelengths within a particular range, e.g., a range that excludes red light (see, e.g., U.S. patent application Ser. No. 12/117,280, filed May 8, 2008 (now U.S. Patent Publication No. 2008/0309255), the entirety of which is hereby incorporated by reference as if set forth in its entirety.

Other techniques for sensing changes in light output of light sources include providing separate or reference emitters and a sensor that measures the light output of these emitters. These reference emitters can be placed so as to be isolated from ambient light such that they typically do not contribute to the light output of the lighting device. Additional techniques for sensing the light output of a light source include measuring ambient light and light output of the lighting device separately and then compensating the measured light output of the light source based on the measured ambient light.

The following discussion of temperature sensors applies to temperature sensors that can be included in any of the light engine components or lighting devices according to the present inventive subject matter.

Some embodiments in accordance with the present inventive subject matter can employ at least one temperature sensor. Persons of skill in the art are familiar with, and have ready access to, a variety of temperature sensors (e.g., thermistors), and any of such temperature sensors can be employed in embodiments in accordance with the present inventive subject matter. Temperature sensors can be used for a variety of purposes, e.g., to provide feedback information to compensation circuitry, e.g., to current adjusters, as described in U.S. patent application Ser. No. 12/117,280, filed May 8, 2008 (now U.S. Patent Publication No. 2008/

0309255), the entirety of which is hereby incorporated by reference as if set forth in its entirety.

In some embodiments, one or more temperature sensors (e.g., a single temperature sensor or a network of temperature sensors) can be provided which are in contact with one or more solid state light emitters (or on the surface of a solid state light emitter support member on which one or more solid state light emitters are mounted), or are positioned close to one or more solid state light emitters (e.g., less than ¼ inch away), such that the temperature sensor(s) provide accurate readings of the temperature of the solid state light emitter(s).

In some embodiments, one or more temperature sensors (e.g., a single temperature sensor or a network of temperature sensors) can be provided which are not in contact with one or more solid state light emitters, and are not positioned close to one or more solid state light emitters, but are positioned such that it (or they) is spaced from the solid state light emitter (or solid state light emitters) by only structure (or structures) having low thermal resistance, such that the temperature sensor(s) provide accurate readings of the temperature of the solid state light emitter(s).

In some embodiments, one or more temperature sensors (e.g., a single temperature sensor or a network of temperature sensors) can be provided which are not in contact with one or more solid state light emitters, and are not positioned close to one or more solid state light emitters, but the arrangement is such that the temperature at the temperature sensor(s) is proportional to the temperature at the solid state light emitter(s), or the temperature at the temperature sensor(s) varies in proportion to the variance of temperature at the solid state light emitter(s), or the temperature at the temperature sensor(s) is correlatable to the temperature at the solid state light emitter(s).

In some embodiments, which can include or not include, as suitable, any of the other features described herein, lighting devices (or lighting device elements) according to the present inventive subject matter can include any suitable thermal management solutions, In some embodiments, which can include or not include, as suitable, any of the other features described herein, heat removal regions can be provided at respective locations on a light engine component and on a lighting device element (to be used together) such that if the light engine component is mounted on the lighting device element (e.g., with a second mechanical engagement region of the light engine component in contact with a first mechanical engagement region of the lighting device element), i.e., so that the light engine component is removably supported by the lighting device element, the desired thermal connection between the light engine component and the lighting device element will be provided.

In some embodiments, which can include or not include, as suitable, any of the other features described herein, any component (or components) of a lighting device can comprise one or more heat dissipation structures, e.g., fins or pins. For instance, in some embodiments, one or more heat dissipation structures can be provided on a first support structure (to which one or more circuit boards can be attached), a second support structure (to which a first support structure is attached and which is attached to a lighting device element), a first circuit board (on which one or more solid state light emitters are mounted), a second circuit board (on which at least one compensation circuit is mounted), and/or a housing member or any other part of a lighting device element.

Some embodiments of lighting devices according to the present inventive subject matter can have only passive cooling. On the other hand, some embodiments of lighting devices according to the present inventive subject matter can have active cooling (and can optionally also have any of the passive cooling features described herein). The expression "active cooling" is used herein in a manner that is consistent with its common usage to refer to cooling that is achieved through the use of some form of energy, as opposed to "passive cooling", which is achieved without the use of energy (i.e., while energy is supplied to the one or more solid state light emitters, passive cooling is the cooling that would be achieved without the use of any component(s) that would require additional energy in order to function to provide additional cooling). In some embodiments of the present inventive subject matter, therefore, cooling is achieved with only passive cooling, while in other embodiments of the present inventive subject matter, active cooling is provided (and any of the features described herein that provide or enhance passive cooling can optionally be included).

In embodiments where active cooling is provided, any type of active cooling can be employed, e.g., blowing or pushing (or assisting in blowing) an ambient fluid (such as air) across or near one or more heat dissipation elements or heat sinks, thermoelectric cooling, phase change cooling (including supplying energy for pumping and/or compressing fluid), liquid cooling (including supplying energy for pumping, e.g., water, liquid nitrogen or liquid helium), magnetoresistance, etc.

In some embodiments, which can include or not include, as suitable, any of the other features described herein, one or more heat spreaders can be provided in order to move heat away from one or more solid state light emitters and/or from one or more solid state light emitter support members to one or more heat sink regions and/or one or more heat dissipation regions, and/or the heat spreader can itself provide surface area from which heat can be dissipated. Persons of skill in the art are familiar with a variety of materials that would be suitable for use in making a heat spreader, and any of such materials (e.g., copper, aluminum, etc.) can be employed.

In some embodiments, which can include or not include, as suitable, any of the other features described herein, a heat spreader can be provided that is in contact with a first surface of a solid state light emitter support member, and one or more solid state light emitters can be mounted on a second surface of the solid state light emitter support member, the first surface and the second surface being on opposite sides of the solid state light emitter support member. In such embodiments, circuitry (e.g., a compensation circuit) can be provided and positioned in contact with such a heat spreader, e.g., a heat spreader can be located between a solid state light emitter support member and a compensation circuit, and/or a heat spreader can have a recess that opens to a surface of the heat spreader that is remote from a solid state light emitter support member, and a compensation circuit can be located within that recess. Such arrangements can be useful for fitting such components into a particular form factor (e.g., an A lamp) while avoiding any of the components blocking any light emitted by the solid state light emitter(s) (or reducing the extent to which any such light may be blocked).

Lighting devices (and lighting device elements) according to the present inventive subject matter can employ any suitable heat dissipation scheme, a wide variety of which (e.g., one or more heat dissipation structures) are well known to persons skilled in the art and/or which can readily be envisioned by persons skilled in the art.

Heat transfer from one structure or region of a lighting device (or lighting device element) to another can be enhanced (i.e., thermal resistivity can be reduced or minimized) using any suitable material or structure for doing so, a variety of which are known to persons of skill in the art, e.g., by means of chemical or physical bonding and/or by interposing a heat transfer aid such as a thermal pad, thermal grease, graphite sheets, etc.

In some embodiments according to the present inventive subject matter, a portion (or portions) of any light engine component, element, or other component of the lighting device or lighting device element) can comprise one or more thermal transfer region(s) that has/have an elevated heat conductivity (e.g., higher than the rest of that component, element or other component. A thermal transfer region (or regions) can be made of any suitable material, and can be of any suitable shape. Use of materials having higher heat conductivity in making the thermal transfer region(s) generally provides greater heat transfer, and use of thermal transfer region(s) of larger surface area and/or cross-sectional area generally provides greater heat transfer. Representative examples of materials that can be used to make the thermal transfer region(s), if provided, include metals, diamond, DLC, etc. Representative examples of shapes in which the thermal transfer region(s), if provided, can be formed include bars, slivers, slices, crossbars, wires and/or wire patterns. A thermal transfer region (or regions), if included, can also function as one or more pathways for carrying electricity, if desired.

In some embodiments, which can include or not include, as suitable, any of the other features described herein, a solid state light emitter support member can comprise at least two support elements, i.e., at least a first support element (e.g., a circuit board on which one or more solid state light emitters are mounted) and at least a second support element to which the first support element is attached. For instance, some embodiments can include at least four support elements, namely: (1) a first circuit board (e.g., a metal core circuit board) on which a plurality of solid state light emitters are mounted (e.g., in an arrangement as depicted in FIG. 12), discussed below, (2) a second circuit board (e.g., a metal core circuit board or an FR4 circuit board) on which at least a first compensation circuit is mounted, (3) a first support structure (e.g., of a material that has high heat conductivity, such as aluminum or copper) to which the first and second circuit boards are attached (permanently or removably) (e.g., on different surfaces of the first support structure, such as on opposite sides) and (4) a second support structure (e.g., of a material that has high heat conductivity, such as aluminum or copper) to which the first support structure is attached (permanently or removably) and which is attached (permanently or removably) to a lighting device element (e.g., a housing member).

In embodiments in which a solid state light emitter support member comprises two or more support elements (e.g., embodiments as described in the preceding paragraph), any support element can be attached (permanently or removably) to any other support element in any suitable way. For instance, in embodiments in which a solid state light emitter support member comprises a first circuit board (on which one or more solid state light emitters are mounted) and a first support structure (e.g., embodiments as described in the preceding paragraph), the first circuit board can be attached to the first support structure with screws (or bolts or rivets), with clips, by screw threading, with adhesive (e.g., thermal paste), by compression (e.g., by heating the first support structure and inserting the first circuit board into a recess (in which the first circuit board fits snugly) in the first support structure, so that when the first support structure cools down, the first circuit board will be compressed within the recess), by electrically conductive pins (that supply electricity to the first circuit board, e.g., from a power supply or to or from a second circuit board) that are bent around the first circuit board to hold the first circuit board in place, by press fitting the first circuit board in a recess in the first support structure, by a ridge and groove (e.g., a ridge on an edge of the first circuit board that fits into a groove or a recess in the first support structure, or a ridge on an edge of a recess in the first support structure that fits into a groove on the first circuit board), or by an arrangement in which a tab on one element fits into a slot on the other element and then the elements are moved relative to one another (e.g., one element is slid or rotated relative to the other). In any such embodiment, the first circuit board and the first support structure can be shaped, positioned relative to each other, and/or engaged with each other so as to provide good thermal coupling, e.g., so that heat generated by the one or more solid state light emitters can be transferred from the solid state light emitter(s) to the first circuit board and then on to the first support structure. In addition, in any such embodiment, the first circuit board and the first support structure can include respective structures that assist in properly aligning the first circuit board relative to the first support structure, e.g., the first circuit board can have one or more tabs that fit into one or more corresponding slots or grooves in the first support structure, and/or the first support structure can have one or more tabs that fit into one or more corresponding slots or grooves in the first circuit board.

Analogously, in embodiments in which a solid state light emitter support member comprises a second circuit board (on which at least one compensation circuit is mounted) and a first support structure, the second circuit board can be attached to the first support structure with screws (or bolts or rivets), with clips, by screw threading, with adhesive (e.g., thermal paste), by compression (e.g., by heating the first support structure and inserting the second circuit board into a recess (in which the second circuit board fits snugly) in the first support structure, so that when the first support structure cools down, the second circuit board will be compressed within the recess), by electrically conductive pins (that supply electricity to the second circuit board, e.g., from a power supply or to or from a first circuit board) that are bent around the second circuit board to hold the second circuit board in place, by press fitting the second circuit board in a recess in the first support structure, by a ridge and groove (e.g., a ridge on an edge of the second circuit board that fits into a groove or a recess in the first support structure, or a ridge on an edge of a recess in the first support structure that fits into a groove on the second circuit board), or by an arrangement in which a tab on one element fits into a slot on the other element and then the elements are moved relative to one another (e.g., one element is slid or rotated relative to the other). In any such embodiment, the second circuit board and the first support structure can be shaped, positioned relative to each other, and/or engaged with each other so as to provide good thermal coupling, e.g., so that heat generated by one or more components on the second circuit board can be transferred to the second circuit board and then on to the first support structure. In addition, in any such embodiment, the second circuit board and the first support structure can include respective structures that assist in properly aligning the second circuit board relative to the first support structure, e.g., the second circuit board can have one or more tabs that fit into one or more corresponding slots or grooves in the first support structure, and/or the first support structure can have one or more tabs that fit into one or more corresponding slots or grooves in the second circuit board.

As indicated above, in some embodiments, which can include or not include, as suitable, any of the other features described herein, a solid state light emitter support member can comprise a first circuit board (on which the one or more solid state light emitters are mounted), a second circuit board (on which at least a first compensation circuit is mounted), and at least a first support structure to which the first and second circuit boards are attached (permanently or removably). In some of such embodiments, the first and second circuit boards can be attached to different surfaces of the first support structure, such as on opposite sides, or the second circuit board can be positioned such that its major surfaces are substantially perpendicular to those of the first circuit board. In some of such embodiments, one or more electrical connections can be provided between contacts (and/or between any other components) on the respective circuit boards in any suitable way. Representative structures (or ways) for providing electrical connection (i.e., electrical connection structures) between components on respective circuit boards include pins (i.e., substantially rigid conductors that can be of any desired shape), insulated wires, ribbon cables (e.g., flat flexible cables (FFC's) or flexible printed circuits (FPC's), interconnects (e.g., made by forming a hole, coating the walls of the hole with insulating material and plating or depositing metal in the hole), solder, conductive clips, wire bonds, spring contacts, or any combination of any of the above. Any of such structures for providing electrical connection between components on respective circuit boards can include suitable electrical insulation, e.g., where one or both of the circuit boards is/are a metal core circuit board.

By providing two or more circuit boards (as is the case in some embodiments, as described above), it is possible to reduce (or even minimize) the surface area of a region from which light is emitted, by positioning some or all of the electrical components that do not emit light on one or more circuit boards that is/are not located on the region from which light is emitted. Such an arrangement (i.e., reducing or minimizing the surface area of a region from which light is emitted) can make it easier to provide for some light to be directed beneath the plane of emission for some or all of the solid state light emitters (e.g., to increase the range of directions in which light is emitted from the lighting device), and also can allow for a more narrow profile for a light engine module, such that a light engine module can fit into lighting device elements for smaller form factor lighting devices and/or so that more space is available for other components, e.g., one or more heat dissipation structures.

In some embodiments, which can include or not include, as suitable, any of the other features described herein, any structure (e.g., circuitry and/or support structure and/or one or more circuit boards) that is located where some light emitted by the one or more solid state light emitters is directed (continuously or intermittently or occasionally), can be made more reflective, e.g., by painting it white.

In some embodiments, which can include or not include, as suitable, any of the other features described herein, any structure (e.g., support structure and/or one or more circuit boards) that is located where some light emitted by the one or more solid state light emitters is directed (continuously or intermittently or occasionally), can be transparent, substantially transparent or partially transparent (e.g., whereby the range of directions that light proceeds from the lighting device can be increased, for example so that more light can travel below the emission plane of the solid state light emitters 112 shown in FIG. 15, discussed below).

In embodiments in which pins are included to provide electrical connection between one or more components on a first circuit board and one or more components on a second circuit board, such pins can be of any desired shape. In some embodiments, one or more pins can be L-shaped. In embodiments in which one or more pins are L-shaped (e.g., having a first portion that is substantially perpendicular to the major surfaces of the circuit board and a second portion that is substantially parallel to the major surfaces of the circuit board), the pin(s) can be attached (e.g., by soldering) to a component mounted on a circuit board, the second portion of the pin can extend parallel to the surface of the circuit board far enough that the first portion of the pin does not come into contact with the edge of the circuit board (which can be useful if the circuit board is a metal core circuit board, i.e., a circuit board that comprises a conductive layer (e.g., of aluminum) (which comprises the majority of the thickness of the circuit board), thin layers of dielectric material positioned on the major surfaces of the conductive layer, and conductive tracks (e.g., of copper) formed on one or both exposed major surfaces of the layers of dielectric material), and if electrical contact between the pin and the conductive layer of the metal core circuit board is not desired. In embodiments in which one or more pins are L-shaped, the pin(s) can also hold the circuit board in place (or assist in doing so).

In embodiments in which pins are included to provide electrical connection between one or more components on a first circuit board and one or more components on a second circuit board, the pin(s) may have ribs and/or indentations in order to hold the pin(s) in place relative to other structure (e.g., relative to a first support structure where the first and second circuit boards are positioned on different surfaces (e.g., opposite sides) of the first support structure). In some embodiments, the pins can exert spring force on a circuit board (or boards) to hold it (or them) in place (or to assist in doing so). In some embodiments in which one or more pins are included, one or more insulating elements can be provided to insulate at least a portion of the pin (or at least portions of plural pins). In some embodiments in which one or more pins are included, a pin (or one or more of plural pins) can be attached to a component on one circuit board (e.g., by soldering) and the pin (including the other end of it) remains substantially in place while one or more other assembly steps are carried out (e.g., attached to a component on the other circuit board).

In embodiments in which pins are included to provide electrical connection between one or more components on a first circuit board and one or more components on a second circuit board, the pin(s) may have any suitable cross-sectional profile, e.g., round, oval, square, hexagonal, rectangular, etc.

In embodiments in which insulated wires are included to provide electrical connection between one or more components on a first circuit board and one or more components on a second circuit board, a plurality of insulated wires can be provided in relatively close proximity to each other (since they are insulated).

In some embodiments in which electrical connection is provided between one or more components on a first circuit board and one or more components on a second circuit board, contact regions (e.g., solder pads) on respective circuit boards can be aligned with one another (for example, in embodiments in which a first circuit board (on which a plurality of solid state light emitters are mounted) and a second circuit board (on which at least one compensation circuit is mounted) are positioned on opposite sides of a first support structure, contact regions on the first and second circuit boards can be aligned such that one or more distance between contact regions on the respective circuit boards is approximately the same as the distance between the respective circuit boards (e.g., they can be positioned similarly relative to an axis extending perpendicularly through the respective circuit boards), and/or the corresponding contact regions are shaped similarly, and/or no components (other than, e.g., one or both circuit boards and/or one or more support structures) are positioned between corresponding contact regions.

In some embodiments in which electrical connection is provided between one or more components on a first circuit board and one or more components on a second circuit board, one or more slots can be provided in any structure that is located between the first and second circuit boards (e.g., a support structure), and/or in the first circuit board and/or the second circuit board, and one or more electrical conductor can extend through the slot (or slots). In such embodiments, fewer solid state light emitters can be included (e.g., in the arrangement depicted in FIG. 12, discussed below, one of the solid state light emitters 181 or 182 can be removed) to provide space for such a slot (or slots).

As indicated above, in some embodiments, which can include or not include, as suitable, any of the other features described herein, a solid state light emitter support member can be provided which comprises a first circuit board (on which the one or more solid state light emitters are mounted), a first support structure to which the first circuit board (and optionally also a second circuit board, if included) is attached (permanently or removably), and a second support structure to which the first support structure is attached (permanently or removably) and which is attached (permanently or removably) to a lighting device element (e.g., a housing member). In such embodiments, the first support structure can be attached to the second support structure in any suitable way, e.g., with screws (or bolts or rivets), with clips, by screw threading, with adhesive (e.g., thermal paste), by compression (e.g., by heating the first support structure and inserting the second support structure into the first support structure (e.g., by inserting a portion of a cylindrical exterior surface of the second support structure into a hollow cylindrical portion of the first support structure, or by inserting a portion of a cylindrical exterior surface of the first support structure into a hollow cylindrical portion of the second support structure), so that when the first support structure cools down, the second support structure will be compressed within the first support structure, or vice-versa), by press fitting a portion of the first support structure into a portion of the second support structure (or vice-versa), by a ridge and groove (e.g., a ridge on the first support structure that fits into a groove in the second support structure, or a ridge on the second support structure that fits into a groove on the first support structure), or by an arrangement in which a tab on one element fits into a slot on the other element and then the elements are moved relative to one another (e.g., one element is slid or rotated relative to the other). In any such embodiment, the first support structure and the second support structure can be shaped, positioned relative to each other, and/or engaged with each other so as to provide good thermal coupling, e.g., so that heat generated by the one or more solid state light emitters that is transferred from the solid state light emitter(s) can be readily transferred to the second support structure. In addition, in any such embodiment, the first support structure and the second support structure can include respective structures that assist in properly aligning the first support structure relative to the second support structure, e.g., the first support structure can have one or more tabs that fit into one or more corresponding slots or grooves in the second support structure, and/or the second support structure can have one or more tabs that fit into one or more corresponding slots or grooves in the first support structure.

In embodiments that comprise one or more circuit boards, the circuit board(s) can be any suitable circuit board, a wide variety of which are well known to persons of skill in the art. In some embodiments, one or more circuit boards can be metal core circuit boards (e.g., at least one circuit board on which one or more solid state light emitters are mounted and/or at least one circuit board on which at least one compensation circuit is mounted can comprise (or each can comprise) a metal core circuit board), one or more circuit boards can be FR4 circuit boards (e.g., at least one circuit board on which at least one compensation circuit is mounted can comprise (or each can comprise) an FR4 circuit board).

As discussed above, in embodiments that comprise one or more support structures, the support structure(s) can comprise any suitable material, and can be of any suitable shape. For example, in such embodiments, one or more support structure can be made of any suitable material that has relatively high heat conductivity, e.g., aluminum, copper. aluminum nitride (AlN), silicon carbide (SiC), diamond-like carbon (DLC), etc. In embodiments that include one or more support structures that is/are made of a metal, if two or more circuit boards (e.g., a first circuit board on which a plurality of solid state light emitters are mounted) and a second circuit board on which at least one compensation circuit is mounted) are mounted on a single support structure, at least one of the circuit boards may need to be insulated from the support structure (e.g., by including an insulating layer between the support structure and the circuit board). In some embodiments that include one or more support structures that is/are made of metal, the support structure(s) can be insulated from the circuit board (or from each of the circuit boards), so that a person touching the support structure (or support structures), e.g., while handling the lighting device, will not be shocked.

In embodiments that comprise one or more support structures, the support structure(s) can provide a space or cavity into which one or more other components of the lighting device can be positioned. For instance, in some embodiments in which a first circuit board (on which a plurality of solid state light emitters are mounted) and a second circuit board (on which at least one compensation circuit is mounted) are positioned on opposite sides of a first support structure (and optionally there can be provided a second support structure, to which the first support structure is attached and which is attached to a lighting device element), the second circuit board can be positioned in an interior space defined by the first support structure (or defined by the first and second support structures). Alternatively or additionally, in such embodiments, a power supply (or one or more components thereof), a source of power (e.g., a battery or a photovoltaic collector), etc. can be positioned within such a space.

In some embodiments, which can include or not include, as suitable, any of the other features described herein, one or more solid state light emitters can be mounted on a first surface of a solid state light emitter support member, and at least some circuitry can be mounted on the first surface.

In some embodiments, which can include or not include, as suitable, any of the other features described herein, one or more solid state light emitters can be mounted on a first surface of a solid state light emitter support member, and at least some circuitry can be mounted on one or more other surfaces of the solid state light emitter support member (in such embodiments, some circuitry can also be mounted on the first surface of the solid state light emitter support member, or no circuitry can be mounted on the first surface of the solid state light emitter support member). In making such devices, circuitry can be mounted on portions of the first surface of the solid state light emitter support member which are later bent so as to become different surfaces (i.e., so as to no longer be part of the first surface of the solid state light emitter support member), e.g., circuit components can be mounted on narrower portions of the first surface of the solid state light emitter support member that protrude from a wider portion of the first surface of the solid state light emitter support member, and the narrower portions are later bent, e.g., to form an angle (e.g., of 90 degrees) relative to the wider portion of the solid state light emitter support member (alternatively, one or more narrower portions can be bent before some or all of the circuitry components eventually mounted thereon are mounted thereon).

In some embodiments, (1) a heat spreader can be provided that is in contact with a second surface of a solid state light emitter support member and one or more solid state light emitters can be mounted on a first surface of the solid state light emitter support member, with the first surface and the second surface being on opposite sides of the solid state light emitter support member, (2) circuitry (e.g., a compensation circuit) can be positioned in contact with such a heat spreader, e.g., a heat spreader can be located between a solid state light emitter support member and a compensation circuit, and/or a heat spreader can have a recess that opens to a surface of the heat spreader that is remote from a solid state light emitter support member and a compensation circuit can be located within that recess, and (3) a temperature sensor (e.g., a thermistor) can be positioned in contact with the heat spreader, e.g., between the heat spreader and the circuitry (e.g., compensation circuit).

The following discussion of compensation circuits applies to the compensation circuits that can be included in any of the light engine modules or lighting devices according to the present inventive subject matter.

Compensation circuits can be provided to help to ensure that the perceived color (including color temperature in the case of "white" light) of light exiting a lighting device is accurate (e.g., within a specific tolerance). Such compensation circuits, if included, can (for example) adjust the current supplied to solid state light emitters that emit light of one color and/or separately adjust the current supplied to solid state light emitters that emit light of a different color, so as to adjust the color of mixed light emitted from lighting devices, and such adjustment(s) can be (1) based on temperature sensed by one or more temperature sensors (if included), and/or (2) based on light emission as sensed by one or more light sensors (if included) (e.g., based on one or more sensors that detect (i) the color of the light being emitted from the lighting device, and/or (ii) the intensity of the light being emitted from one or more of the solid state light emitters, and/or (iii) the intensity of light of one or more specific hues of color), and/or based on any other sensors (if included), factors, phenomena, etc.

A wide variety of compensation circuits are known, and any can be employed in the lighting devices according to the present inventive subject matter. For example, a compensation circuit may comprise a digital controller, an analog controller or a combination of digital and analog. For example, a compensation circuit may comprise an application specific integrated circuit (ASIC), a microprocessor, a microcontroller, a collection of discrete components or combinations thereof. In some embodiments, a compensation circuit may be programmed to control one or more solid state light emitters. In some embodiments, control of one or more solid state light emitters may be provided by the circuit design of the compensation circuit and is, therefore, fixed at the time of manufacture. In still further embodiments, aspects of the compensation circuit, such as reference voltages, resistance values or the like, may be set at the time of manufacture so as to allow adjustment of the control of the one or more solid state light emitters without the need for programming or control code.

In some embodiments, which can include or not include, as suitable, any of the other features described herein, one or more solid state light emitters can be mounted on a first surface of a solid state light emitter support member, the solid state light emitter support member can be positioned within a housing member, and the first surface area does not fill the entire cross-section of the housing member, so that the majority of the light emitted by the solid state light emitters travels into a first hemisphere defined by the first surface and in which the solid state light emitters are located, but some light emitted by the one or more solid state light emitters also travels into a second hemisphere which is complementary to the first hemisphere, i.e., if the first surface is horizontal and the solid state light emitters are mounted on top of the first surface, a majority of the light emitted by the solid state light emitters travels upward, but a portion of the light emitted by the solid state light emitters can travel downward, e.g., through spaces defined between a perimeter of the solid state light emitter support member and the inside wall of the housing member (in which the solid state light emitter support member is mounted) in a plane defined by the first surface (or at least a portion of the first surface).

In some embodiments, which can include or not include, as suitable, any of the other features described herein, one or more solid state light emitters can be mounted on a first surface of a solid state light emitter support member, and at least 40% (and in some embodiments, at least 50%, at least 60%, at least 70%, at least 80%, at least 90% or at least 95%) of the surface area of the first surface of the solid state light emitter support member is covered by a solid state light emitter. Such embodiments can be helpful in providing devices in which solid state light emitters are relatively tightly packed on a surface of a solid state light emitter support member and the surface area of the solid state light emitter support member can as a result be smaller than a cross-sectional space defined by an inside wall of a housing member, so that a majority of the light emitted by the solid state light emitters travels into a first hemisphere defined by the first surface and in which the solid state light emitters are located, but some light emitted by the one or more solid state light emitters also travels into a second hemisphere which is complementary to the first hemisphere, as described in the preceding paragraph. Such reduction in the surface area of a surface of a solid state light emitter support member on which solid state light emitters are mounted can be referred to as "reducing the light aperture" or "minimizing the light aperture". Optionally, in any of such embodiments described above in this paragraph, one or more electrical contact regions or elements can be positioned on the surface of the solid state light emitter support member on which solid state light emitters are mounted, The lighting devices (or lighting device element) according to the present inventive subject matter can direct light in any desired range of directions. For instance, in some embodiments, the lighting device (or lighting device element) can direct light substantially omnidirectionally (i.e., substantially 100% of all directions extending from a center of the lighting device), i.e., within a volume defined by a two-dimensional shape in an x, y plane that encompasses rays extending from 0 degrees to 180 degrees relative to the y axis (i.e., 0 degrees extending from the origin along the positive y axis, 180 degrees extending from the origin along the negative y axis), the two-dimensional shape being rotated 360 degrees about the y axis (in some cases, the y axis can be a vertical axis of the lighting device). In some embodiments, the lighting device (or lighting device element) emits light substantially in all directions within a volume defined by a two-dimensional shape in an x, y plane that encompasses rays extending from 0 degrees to 150 degrees relative to the y axis (extending along a vertical axis of the lighting device), the two-dimensional shape being rotated 360 degrees about the y axis. In some embodiments, the lighting device (or lighting device element) emits light substantially in all directions within a volume defined by a two-dimensional shape in an x, y plane that encompasses rays extending from 0 degrees to 120 degrees relative to the y axis (extending along a vertical axis of the lighting device), the two-dimensional shape being rotated 360 degrees about the y axis. In some embodiments, the lighting device (or lighting device element) emits light substantially in all directions within a volume defined by a two-dimensional shape in an x, y plane that encompasses rays extending from 0 degrees to 90 degrees relative to the y axis (extending along a vertical axis of the lighting device), the two-dimensional shape being rotated 360 degrees about the y axis (i.e., a hemispherical region). In some embodiments, the two-dimensional shape can instead encompass rays extending from an angle in the range of from 0 to 30 degrees (or from 30 degrees to 60 degrees, or from 60 degrees to 90 degrees) to an angle in the range of from 90 to 120 degrees (or from 120 degrees to 150 degrees, or from 150 degrees to 180 degrees). In some embodiments, the range of directions in which the lighting device (or lighting device element) emits light can be non-symmetrical about any axis, i.e., different embodiments can have any suitable range of directions of light emission, which can be continuous or discontinuous (e.g., regions of ranges of emissions can be surrounded by regions of ranges in which light is not emitted). In some embodiments, the lighting device (or lighting device element) can emit light in at least 50% of all directions extending from a center of the lighting device (or lighting device element) (e.g., hemispherical being 50%), and in some embodiments at least 60%, 70%, 80%, 90% or more.

Lighting devices in accordance with the present inventive subject matter can be designed to emit light in any suitable pattern, e.g., in the form of a flood light, a spotlight, a downlight, etc. Lighting devices according to the present inventive subject matter can comprise one or more light sources that emit light in any suitable pattern, or one or more light sources that emit light in each of a plurality of different patterns.

It would be especially desirable to provide a lighting device that comprises one or more solid state light emitters (and in which some or all of the light produced by the lighting device is generated by solid state light emitters), where the lighting device can be easily substituted (i.e., retrofitted or used in place of initially) for a conventional lighting device (e.g., an incandescent lighting device, a fluorescent lighting device or other conventional types of lighting devices), for example, a lighting device (that comprises one or more solid state light emitters) that can be engaged with the same socket that the conventional lighting device is engaged (a representative example being simply unscrewing an incandescent lighting device from an Edison socket and threading in the Edison socket, in place of the incandescent lighting device, a lighting device that comprises one or more solid state light emitters). In some aspects of the present inventive subject matter, such lighting devices are provided.

Some embodiments in accordance with the present inventive subject matter (which can include or not include any of the features described elsewhere herein) include one or more lenses, diffusers or light control elements. Persons of skill in the art are familiar with a wide variety of lenses, diffusers and light control elements, can readily envision a variety of materials out of which a lens, a diffuser, or a light control element can be made (e.g., polycarbonate materials, acrylic materials, fused silica, polystyrene, etc.), and are familiar with and/or can envision a wide variety of shapes that lenses, diffusers and light control elements can be. Any of such materials and/or shapes can be employed in a lens and/or a diffuser and/or a light control element in an embodiment that includes a lens and/or a diffuser and/or a light control element. As will be understood by persons skilled in the art, a lens or a diffuser or a light control element in a lighting device according to the present inventive subject matter can be selected to have any desired effect on incident light (or no effect), such as focusing, diffusing, altering the direction of emission from the lighting device (e.g., increasing the range of directions that light proceeds from the lighting device, such as bending light to travel below the emission plane of the solid state light emitters 296 shown in FIG. 17, discussed below), etc. Any such lens and/or diffuser and/or light control element can comprise one or more luminescent materials, e.g., one or more phosphor.

In embodiments in accordance with the present inventive subject matter that include a lens (or plural lenses), the lens (or lenses) can be positioned in any suitable location and orientation.

In some embodiments, a lens (or two or more lenses) can be provided which, together with a housing member (and/or an electrical connector), defines a space in which one or more light engine component (which can comprise one or more solid state light emitters and optionally one or more solid state light emitter support members) is/are positioned, whereby at least some of the light that is emitted by the one or more solid state light emitters passes through the lens (or lenses). In such embodiments, the lens (or lenses) can be of any suitable shape, e.g., any shape that corresponds to a portion of a conventional lighting device (e.g., a shape that corresponds to a transparent portion of a conventional lighting device, a shape that includes a region that corresponds to a transparent portion of a conventional lighting device, or a shape that corresponds to a portion of a transparent portion of a conventional lighting device).

In embodiments in accordance with the present inventive subject matter that include a diffuser (or plural diffusers), the diffuser (or diffusers) can be positioned in any suitable location and orientation. In some embodiments, which can include or not include any of the features described elsewhere herein, a diffuser can be provided over a top or any other part of the lighting device. A diffuser can be included in the form of a diffuser film/layer that is arranged to mix light emission from solid state light emitters in the near field. That is, a diffuser can mix the emission of solid state light emitters, such that when the lighting device is viewed directly, the light from the discrete solid state light emitters is not separately identifiable.

A diffuser film (if employed) can comprise any of many different structures and materials arranged in different ways, e.g., it can comprise a conformally arranged coating over a lens. In some embodiments, commercially available diffuser films can be used such as those provided by Bright View Technologies, Inc. of Morrisville, N.C., Fusion Optix, Inc. of Cambridge, Mass., or Luminit, Inc. of Torrance, Calif. Some of these films can comprise diffusing microstructures that can comprise random or ordered micro lenses or geometric features and can have various shapes and sizes. A diffuser film can be sized to fit over all or less than all of a lens, and can be bonded in place over a lens using known bonding materials and methods. For example, a film can be mounted to a lens with an adhesive, or could be film insert molded with a lens. In other embodiments, a diffuser film can comprise scattering particles, or can comprise index photonic features, alone or in combination with microstructures. A diffuser film can have any of a wide range of suitable thicknesses (some diffuser films are commercially available in a thickness in the range of from 0.005 inches to 0.125 inches, although films with other thicknesses can also be used).

In other embodiments, a diffuser and/or scattering pattern can be directly patterned onto a component, e.g., a lens. Such a pattern may, for example, be random or a pseudo pattern of surface elements that scatter or disperse light passing through them. The diffuser can also comprise microstructures within the component (e.g., lens), or a diffuser film can be included within the component (e.g., lens).

Diffusion and/or light scattering can also be provided or enhanced through the use of additives, a wide variety of which are well known to persons of skill in the art. Any of such additives can be contained in a lumiphor, in an encapsulant, and/or in any other suitable element or component of the lighting device.

In embodiments in accordance with the present inventive subject matter that include a light control element (or plural light control elements), the light control element (or light control elements) can be positioned in any suitable location and orientation. Persons of skill in the art are familiar with a variety of light control elements, and any of such light control elements can be employed. For example, representative light control elements are described in U.S. Patent Application No. 61/245,688, filed on Sep. 25, 2009, the entirety of which is hereby incorporated by reference as if set forth in its entirety. A light control element (or elements) can be any structure or feature that alters the overall nature of a pattern formed by light emitted by a light source. As such, the expression "light control element", as used herein, encompasses, e.g., films and lenses that comprise one or more volumetric light control structures and/or one or more surface light control features.

In some embodiments, there can be provided one or more light engine component that extends from one side of an interface between a housing member and a lens to the other side of such interface. For example, there can be provided a lighting device which (1) if oriented such that such interface is horizontal (or substantially horizontal), the lens is above the interface and the housing member is below the interface, and which (2) comprises a light engine module (or modules) that extends from below the interface to above the interface. Such a lighting device can comprise one or more solid state light emitters mounted on a portion (or portions) of one or more solid state light emitter support members that are on the side of the interface on which the lens is located, as well as one or more solid state light emitters that are on the side of the interface on which the housing member is located (e.g., one or more solid state light emitters can be positioned on a first surface of the solid state light emitter support member that is an extremity of the solid state light emitter support member and that is substantially parallel to the interface, and one or more solid state light emitters can be positioned on surfaces of the solid state light emitter support member that extend from the first surface toward the interface). In such lighting devices, one or more light engine modules can be shaped and oriented as a pedestal, with solid state light emitters positioned on the top and the sides of the pedestal. Such embodiments (i.e., embodiments as described in this paragraph) can be helpful in providing devices in which solid state light emitters are relatively tightly packed on a surface of a solid state light emitter support member and the surface area of the solid state light emitter support member can as a result be smaller than a space defined by an inside wall of a housing, so that a majority of the light emitted by the solid state light emitters travels into a first hemisphere defined by the first surface and in which the solid state light emitters are located, but some light emitted by the one or more solid state light emitters also travels into a second hemisphere which is complementary to the first hemisphere, i.e., such embodiments can achieve (or help to achieve) reducing the light aperture or minimizing the light aperture.

In addition, one or more scattering elements (e.g., layers) can optionally be included in the lighting devices according to the present inventive subject matter. For example, a scattering element can be included in a lumiphor, and/or a separate scattering element can be provided. A wide variety of separate scattering elements are well known to those of skill in the art, and any such elements can be employed in the lighting devices of the present inventive subject matter. Scattering elements can be made from different materials, such as particles of titanium dioxide, alumina, silicon carbide, gallium nitride, or glass micro spheres, e.g., with the particles dispersed within a lens.

Lighting devices according to the present inventive subject matter can be of any desired overall shape and size. In some embodiments, the lighting devices according to the present inventive subject matter are of size and shape (i.e., form factor) that correspond to any of the wide variety of light sources in existence, e.g., A lamps, B-10 lamps, BR lamps, C-7 lamps, C-15 lamps, ER lamps, F lamps, G lamps, K lamps, MB lamps, MR lamps, PAR lamps, PS lamps, R lamps, S lamps, S-11 lamps, T lamps, Linestra 2-base lamps, AR lamps, ED lamps, E lamps, BT lamps, Linear fluorescent lamps, U-shape fluorescent lamps, circline fluorescent lamps, single twin tube compact fluorescent lamps, double twin tube compact fluorescent lamps, triple twin tube compact fluorescent lamps, A-line compact fluorescent lamps, screw twist compact fluorescent lamps, globe screw base compact fluorescent lamps, reflector screw base compact fluorescent lamps, etc. Within each of the lamp types identified in the previous sentence, numerous different varieties (or an infinite number of varieties) exist. For example, a number of different varieties of conventional A lamps exist and include those identified as A 15 lamps, A 17 lamps, A 19 lamps, A 21 lamps and A 23 lamps. The expression "A lamp"

as used herein includes any lamp that satisfies the dimensional characteristics for A lamps as defined in ANSI C78.20-2003, including the conventional A lamps identified in the preceding sentence. Some representative examples of form factors include mini Multi-mirror® projection lamps, Multi-mirror® projection lamps, reflector projection lamps, 2-pin-vented base reflector projection lamps, 4-pin base CBA projection lamps, 4-pin base BCK projection lamps, DAT/DAK DAY/DAK incandescent projection lamps, DEK/DFW/DHN incandescent projection lamps, CAR incandescent projection lamps CAZ/CZB incandescent projection lamps, CZX/DAB incandescent projection lamps, DDB incandescent projection lamps, DRB DRC incandescent projection lamps, DRS incandescent projection lamps, BLX BLC BNF incandescent projection lamps, CDD incandescent projection lamps, CRX/CBS incandescent projection lamps, BAH BBA BCA ECA standard photofloods, EBW ECT standard photofloods, EXV EXX EZK reflector photofloods, DXC EAL reflector photofloods, double-ended projection lamps, G-6 G5.3 projection lamps, G-7 G29.5 projection lamps, G-7 2 button projection lamps, T-4 GY6.35 projection lamps, DFN/DFC/DCH/DJA/DFP incandescent projection lamps, DLD/DFZ GX17q incandescent projection lamps, DJL G17q incandescent projection lamps, DPT mog base incandescent projection lamps, lamp shape B (B8 cand, B10 can, B13 med), lamp shape C (C7 cand, C7 DC bay), lamp shape CA (CA8 cand, CA9 med, CA10 cand, CA10 med), lamp shape G (G16.5 cand, G16.5 DC bay, G16.5 SC bay, G16.5 med, G25 med, G30 med, G30 med slut, G40 med, G40 mog) T6.5 DC bay, T8 disc (a single light engine component could be placed in one end, or a pair could be positioned one in each end), T6.5 inter, T8 med, lamp shape T (T4 cand, T4.5 cand, T6 cand, T6.5 DC bay, T7 cand, T7 DC bay, T7 inter, T8 cand, T8 DC bay, T8 inter, T8SC bay, T8 SC Pf, T10 med, T10 med Pf, T12 3C med, T14 med Pf, T20 mog bipost, T20 med bipost, T24 med bipost), lamp shape M (M14 med), lamp shape ER (ER30 med, ER39 med), lamp shape BR (BR30 med, BR40 med), lamp shape R (R14 SC bay, R14 inter, R20 med, R25 med, R30 med, R40 med, R40 med skrt, R40 mog, R52 mog), lamp shape P (P25 3C mog), lamp shape PS (PS25 3C mog, PS25 med, PS30 med, PS30 mog, PS35 mog, PS40 mog, PS40 mog Pf, PS52 mog), lamp shape PAR (PAR 20 med NP, PAR 30 med NP, PAR 36 scrw trim, PAR 38 slat, PAR 38 med skrt, PAR38 med sid pr, PAR46 scrw trm, PAR46 mog end pr, PAR46 med sid pr, PAR56 scrw trm, PAR56 mog end pr, PAR56 mog end pr, PAR64 scrw trm, PAR64 ex mog end pr). (see https://www.gecatalogs.com/lighting/software/GELightingCatalogSetup.exe)(with respect to each of the form factors, a light engine component can be positioned in any suitable location, e.g., with its axis coaxial with an axis of the form factor (e.g., as shown in FIG. 17, discussed below) and in any suitable location relative to the respective electrical connector). The lamps according to the present inventive subject matter can satisfy (or not satisfy) any or all of the other characteristics for A lamps (defined in ANSI C78.20-2003), or for any other type of lamp.

Any desired circuitry (instead of or in addition to one or more compensation circuits, as discussed above), including any desired electronic components, can be employed in order to supply energy to one or more solid state light emitters according to the present inventive subject matter.

For example, solid state lighting systems have been developed that include a power supply that receives AC line voltage and converts that voltage to a voltage (e.g., to DC and to a different voltage value) and/or current suitable for driving solid state light emitters. Power supplies for light emitting diode light sources can include any of a wide variety of electrical components, e.g., linear current regulated supplies and/or pulse width modulated current and/or voltage regulated supplies, and can include bridge rectifiers, transformers, power factor controllers etc.

In some embodiments that comprise a first circuit board (on which a plurality of solid state light emitters are mounted) and a second circuit board (on which at least one compensation circuit is mounted), one or more electrical connections can be made among a power supply (which may or may not be part of the lighting device), the second circuit board and the first circuit board, and one or more other electrical connections can be made between the first and second circuit boards. For instance, two pins can be included that electrically contact the power supply, the second circuit board and the first circuit board (to power some or all of the solid state light emitters), and two pins can be included that electrically contact the first and second circuit boards, to provide for bypass around a subset of the solid state light emitters.

In some embodiments that comprise one or more support structures, a first circuit board (on which a plurality of solid state light emitters are mounted) and a second circuit board (on which at least one compensation circuit is mounted), the support structure (or at least one of the plural support structures) can provide electrical connection (1) between the second circuit board and the first circuit board, and/or (2) between the first circuit board and a power supply (which may or may not be part of the lighting device), and/or (3) between the second circuit board and a power supply (which may or may not be part of the lighting device), and/or (4) between the first circuit board and an electrical connector (which may or may not be part of the lighting device), and/or (5) between the second circuit board and an electrical connector (which may or may not be part of the lighting device).

In some embodiments that comprise one or more support structures and a first circuit board (on which a plurality of solid state light emitters are mounted), the support structure (or at least one of the plural support structures) can provide electrical connection between the first circuit board and a power supply (which may or may not be part of the lighting device), and/or between the first circuit board and an electrical connector (which may or may not be part of the lighting device).

Various electronic components (if provided in the lighting devices) can be mounted in any suitable way. For example, in some embodiments, light emitting diodes can be mounted on one or more solid state light emitter support member, and electronic circuitry that can convert AC line voltage into DC voltage suitable for being supplied to light emitting diodes can be mounted on a separate element (e.g., a "driver circuit board"), whereby line voltage is supplied to the electrical connector and passed along to a driver circuit board, the line voltage is converted to DC voltage suitable for being supplied to light emitting diodes in the driver circuit board, and the DC voltage is passed along to the solid state light emitter support member (or members) where it is then supplied to the light emitting diodes. In some embodiments according to the present inventive subject matter, the solid state light emitter support member can comprise a metal core circuit board.

Some embodiments in accordance with the present inventive subject matter can comprise a power line that can be connected to a source of power (such as a branch circuit, an electrical outlet, a battery, a photovoltaic collector, etc.) and that can supply power to an electrical connector (or directly to an electrical contact, e.g., the power line itself can be an electrical connector). Persons of skill in the art are familiar with, and have ready access to, a variety of structures that can be used as a power line. A power line can be any structure that can carry electrical energy and supply it to an electrical connector on a lighting device and/or to a lighting device according to the present inventive subject matter.

Energy can be supplied to the lighting devices according to the present inventive subject matter from any source or combination of sources, for example, the grid (e.g., line voltage), one or more batteries, one or more photovoltaic energy collection devices (i.e., a device that includes one or more photovoltaic cells that convert energy from the sun into electrical energy), one or more windmills, etc.

In some embodiments according to the present inventive subject matter, the lighting device is a self-ballasted device. For example, in some embodiments, the lighting device can be directly connected to AC current (e.g., by being plugged into a wall receptacle, by being screwed into an Edison socket, by being hard-wired into a branch circuit, etc.).

Lighting devices (and lighting device elements) according to the present inventive subject matter can comprise any suitable structures. For example, lighting devices (or lighting device elements) according to the present inventive subject matter can comprise a mixing chamber element, and/or can be attached to a trim element and/or a fixture element A mixing chamber element (if included) can be of any suitable shape and size, and can be made of any suitable material or materials. Light emitted by one or more solid state light emitters can be mixed to a suitable extent in a mixing chamber before exiting the lighting device.

Representative examples of materials that can be used for making a mixing chamber element include, among a wide variety of other materials, spun aluminum, stamped aluminum, die cast aluminum, rolled or stamped steel, hydroformed aluminum, injection molded metal, injection molded thermoplastic, compression molded or injection molded thermoset, molded glass, liquid crystal polymer, polyphenylene sulfide (PPS), clear or tinted acrylic (PMMA) sheet, cast or injection molded acrylic, thermoset bulk molded compound or other composite material. In some embodiments, a mixing chamber element can consist of or can comprise a reflective element (and/or one or more of its surfaces can be reflective). Such reflective elements (and surfaces) are well-known and readily available to persons skilled in the art. A representative example of a suitable material out of which a reflective element can be made is a material marketed by Furukawa (a Japanese corporation) under the trademark MCPET®.

In some embodiments, a mixing chamber is defined (at least in part) by a mixing chamber element. In some embodiments, a mixing chamber is defined in part by a mixing chamber element (and/or by a trim element) and in part by a lens and/or a diffuser.

In some embodiments, at least one trim element can be attached to a lighting device according to the present inventive subject matter. A trim element (if included) can be of any suitable shape and size, and can be made of any suitable material or materials. Representative examples of materials that can be used for making a trim element include, among a wide variety of other materials, spun aluminum, stamped aluminum, die cast aluminum, rolled or stamped steel, hydroformed aluminum, injection molded metal, iron, injection molded thermoplastic, compression molded or injection molded thermoset, glass (e.g., molded glass), ceramic, liquid crystal polymer, polyphenylene sulfide (PPS), clear or tinted acrylic (PMMA) sheet, cast or injection molded acrylic, thermoset bulk molded compound or other composite material. In some embodiments that include a trim element, the trim element can consist of or can comprise a reflective element (and/or one or more of its surfaces can be reflective). Such reflective elements (and surfaces) are well known and readily available to persons skilled in the art. A representative example of a suitable material out of which a reflective element can be made is a material marketed by Furukawa (a Japanese corporation) under the trademark MCPET®.

In some embodiments according to the present inventive subject matter, a mixing chamber element can be provided which comprises a trim element (e.g., a single structure can be provided which acts as a mixing chamber element and as a trim element, a mixing chamber element can be integral with a trim element, and/or a mixing chamber element can comprise a region that functions as a trim element). In some embodiments, such structure can also comprise some or all of a thermal management system for the lighting device. By providing such a structure, it is possible to reduce or minimize the thermal interfaces between the solid state light emitter(s) and the ambient environment (and thereby improve heat transfer), especially, in some cases, in devices in which a trim element acts as a heat sink for light source(s) (e.g., solid state light emitters) and is exposed to a room. In addition, such a structure can eliminate one or more assembly steps, and/or reduce parts count. In such lighting devices, the structure (i.e., the combined mixing chamber element and trim element) can further comprise one or more reflector and/or reflective film, with the structural aspects of the mixing chamber element being provided by the combined mixing chamber element and trim element).

In some embodiments, a lighting device (or lighting device element) according to the present inventive subject matter can be attached to at least one fixture element. A fixture element, when included, can comprise a fixture housing, a mounting structure, an enclosing structure, and/or any other suitable structure. Persons of skill in the art are familiar with, and can envision, a wide variety of materials out of which such fixture elements can be constructed, and a wide variety of shapes for such fixture elements. Fixture elements made of any of such materials and having any of such shapes can be employed in accordance with the present inventive subject matter.

In some embodiments, a fixture element, if provided, can further comprise an electrical connector that engages an electrical connector on the lighting device (or lighting device element) or that is electrically connected to the lighting device (or lighting device element).

In some embodiments that include a fixture element, an electrical connector is provided that is substantially non-moving relative to the fixture element, e.g., the force normally employed when installing an Edison plug in an Edison socket does not cause the Edison socket to move more than one centimeter relative to the fixture element, and in some embodiments, not more than ½ centimeter (or not more than ¼ centimeter, or not more than one millimeter, etc.). In some embodiments, an electrical connector that engages an electrical connector on the lighting device (or lighting device element) can move relative to a fixture element, and structure can be provided to limit movement of the lighting device (or lighting device element) relative to the fixture element.

In some embodiments, one or more structures can be attached to a lighting device (or lighting device element) that engage structure in a fixture element to hold the lighting device (or lighting device element) in place relative to the fixture element. In some embodiments, the lighting device (or lighting device element) can be biased against a fixture element, e.g., so that a flange portion of a trim element is maintained in contact (and forced against) a bottom region of a fixture element (e.g., a circular extremity of a cylindrical can light housing).

The lighting devices (or lighting device element) of the present inventive subject matter can be arranged in generally any suitable orientation, a variety of which are well known to persons skilled in the art. For example, the lighting device (or lighting device element) can be a back-reflecting device or a front-emitting device.

Persons of skill in the art are familiar with, and have ready access to, a wide variety of filters (discussed in more detail below), and any suitable filter (or filters), or combinations of different types of filters, can be employed in accordance with the present inventive subject matter. Such filters can include (1) pass-through filters, i.e., filters in which light to be filtered is directed toward the filter, and some or all of the light passes through the filter (e.g., some of the light does not pass through the filter) and the light that passes through the filter is the filtered light, (2) reflection filters, i.e., filters in which light to be filtered is directed toward the filter, and some or all of the light is reflected by the filter (e.g., some of the light is not reflected by the filter) and the light that is reflected by the filter is the filtered light, and (3) filters that provide a combination of both pass-through filtering and reflection filtering.

In many situations, the lifetime of solid state light emitters can be correlated to a thermal equilibrium temperature (e.g., junction temperatures of solid state light emitters). The correlation between lifetime and junction temperature may differ based on the manufacturer (e.g., in the case of solid state light emitters, Cree, Inc., Philips-Lumileds, Nichia, etc). The lifetimes are typically rated as thousands of hours at a particular temperature (junction temperature in the case of solid state light emitters). Thus, in particular embodiments, a component or components of a thermal management system of a lighting device (or lighting device element) is/are selected so as to extract heat from the solid state light emitter(s) and dissipate the extracted heat to a surrounding environment at such a rate that a temperature is maintained at or below a particular temperature, e.g., to maintain a junction temperature of a solid state light emitter at or below a 25,000 hour rated lifetime junction temperature for the solid state light source in a 25° C. surrounding environment, in some embodiments, at or below a 35,000 hour rated lifetime junction temperature, in further embodiments, at or below a 50,000 hour rated lifetime junction temperature, or other hour values, or in other embodiments, analogous hour ratings where the surrounding temperature is 35° C. (or any other value).

Solid state light emitter lighting systems can offer a long operational lifetime relative to conventional incandescent and fluorescent bulbs. LED lighting system lifetime is typically measured by an "L70 lifetime", i.e., a number of operational hours in which the light output of the LED lighting system does not degrade by more than 30%. Typically, an L70 lifetime of at least 25,000 hours is desirable, and has become a standard design goal. As used herein, L70 lifetime is defined by Illuminating Engineering Society Standard LM-80-08, entitled *"IES Approved Method for Measuring Lumen Maintenance of LED Light Sources"*, Sep. 22, 2008, ISBN No. 978-0-87995-227-3, also referred to herein as "LM-80", the disclosure of which is hereby incorporated herein by reference in its entirety as if set forth fully herein.

Various embodiments are described herein with reference to "expected L70 lifetime." Because the lifetimes of solid state lighting products are measured in the tens of thousands of hours, it is generally impractical to perform full term testing to measure the lifetime of the product. Therefore, projections of lifetime from test data on the system and/or light source are used to project the lifetime of the system. Such testing methods include, but are not limited to, the lifetime projections found in the ENERGY STAR Program Requirements cited above or described by the ASSIST method of lifetime prediction, as described in *"ASSIST Recommends . . . LED Life For General Lighting: Definition of Life"*, Volume 1, Issue 1, February 2005, the disclosure of which is hereby incorporated herein by reference as if set forth fully herein. Accordingly, the term "expected L70 lifetime" refers to the predicted L70 lifetime of a product as evidenced, for example, by the L70 lifetime projections of ENERGY STAR, ASSIST and/or a manufacturer's claims of lifetime.

Lighting devices according to some embodiments of the present inventive subject matter provide an expected L70 lifetime of at least 25,000 hours. Lighting devices according to some embodiments of the present inventive subject matter provide expected L70 lifetimes of at least 35,000 hours, and lighting devices according to some embodiments of the present inventive subject matter provide expected L70 lifetimes of at least 50,000 hours.

In some aspects of the present inventive subject matter, there are provided lighting devices that provide good efficiency and that are within the size and shape constraints of the lamp for which the lighting device is a replacement. In some embodiments of this type, there are provided lighting devices that provide lumen output of at least 600 lumens, and in some embodiments at least 750 lumens, at least 900 lumens, at least 1000 lumens, at least 1100 lumens, at least 1200 lumens, at least 1300 lumens, at least 1400 lumens, at least 1500 lumens, at least 1600 lumens, at least 1700 lumens, at least 1800 lumens (or in some cases at least even higher lumen outputs), and/or CRI Ra of at least 70, and in some embodiments at least 80, at least 85, at least 90 or at least 95).

In some aspects of the present inventive subject matter, which can include or not include any of the features described elsewhere herein, there are provided lighting devices that provide sufficient lumen output (to be useful as a replacement for a conventional lamp), that provide good efficiency and that are within the size and shape constraints of the lamp for which the lighting device is a replacement. In some cases, "sufficient lumen output" means at least 75% of the lumen output of the lamp for which the lighting device is a replacement, and in some cases, at least 85%, 90%, 95%, 100%, 105%, 110%, 115%, 120% or 125% of the lumen output of the lamp for which the lighting device is a replacement.

The present inventive subject matter is further directed to methods comprising removably supporting any light engine component according to the description herein on any lighting device element according to the description herein (or mounting any light engine component according to the description herein to any lighting device element according to the description herein). In embodiments according to the present inventive subject matter, removably supporting a light engine component on a lighting device element (or mounting a light engine component to a lighting device element) can be performed in any suitable way that results in the light engine component being removably supported on the lighting device element.

The present inventive subject matter is further directed to methods comprising (1) removing at least a first light engine component from a lighting device element, and (2) removably supporting at least a second light engine component on the lighting device element. In embodiments according to the present inventive subject matter, removing a light engine component from a lighting device element can be performed in any suitable way that results in the removal of the light engine component from the lighting device element.

Removably supporting a light engine component on a lighting device element (or mounting a light engine component to a lighting device element) can be accomplished by any suitable way, e.g., by placing the light engine component relative to the lighting device element at a location where structure on the light engine component engages structure on the lighting device element (e.g., engaging respective threads, pins fitting into recesses, a clip on one of the structures engaging the other structure, geometrical engagement such as respective tapered surfaces in engagement), through the use of structure(s) and/or material that removably hold the light engine component in place relative to the lighting device element (e.g., using a clip that holds the light engine component and the lighting device element together, using screws, bolts/nuts, rivets, clips, helical springs, leaf springs, notches, bumps, adhesive, etc.), or by providing any other relationship by which a light engine component is removably supported on a lighting device element, e.g., as described herein, using tools or not using tools.

Embodiments in accordance with the present inventive subject matter are described herein in detail in order to provide exact features of representative embodiments that are within the overall scope of the present inventive subject matter. The present inventive subject matter should not be understood to be limited to such detail.

Embodiments in accordance with the present inventive subject matter are also described with reference to cross-sectional (and/or plan view) illustrations that are schematic illustrations of idealized embodiments of the present inventive subject matter. As such, variations from the shapes of the illustrations as a result, for example, of manufacturing techniques and/or tolerances, are to be expected. Thus, embodiments of the present inventive subject matter should not be construed as being limited to the particular shapes of regions illustrated herein but are to include deviations in shapes that result, for example, from manufacturing. For example, a molded region illustrated or described as a rectangle will, typically, have rounded or curved features. Thus, the regions illustrated in the figures are schematic in nature and their shapes are not intended to illustrate the precise shape of a region of a device and are not intended to limit the scope of the present inventive subject matter.

The lighting devices illustrated herein are illustrated with reference to cross-sectional drawings. These cross sections may be rotated around a central axis to provide lighting devices that are circular in nature. Alternatively, the cross sections may be replicated to form sides of a polygon, such as a square, rectangle, pentagon, hexagon or the like, to provide a lighting device. Thus, in some embodiments, objects in a center of the cross-section may be surrounded, either completely or partially, by objects at the edges of the cross-section.

FIG. 1 illustrates a lighting device 10 in accordance with the present inventive subject matter. Referring to FIG. 1, the lighting device 10 comprises a light engine component in the form of a light engine module that comprises a solid state light emitter support member 12 and a solid state light emitter 13 mounted on the solid state light emitter support member 12. The lighting device 10 further comprises a lighting device element that comprises a housing member 14 and a reflective element 15. The housing member 14 comprises heat dissipation structures in the form of a plurality of heat dissipation fins 16 and a plurality of heat dissipation pins 23.

The housing member 14 has a mechanical engagement region 17, and the solid state light emitter support member 12 has a mechanical engagement region 18, the mechanical engagement region 18 being in contact with the mechanical engagement region 17 As shown in FIG. 1, mechanical engagement region 17 and the mechanical engagement region 18 are each tapered (each being frustoconical).

In addition, the housing member 14 has a pair of electrical contact regions 19 and 20, and the solid state light emitter support member 12 has a pair of electrical contact regions 21 and 22, the electrical contact region 19 being in contact with the electrical contact region 21, and the electrical contact region 20 being in contact with the electrical contact region 22.

FIG. 2 is a close-up view of a portion of the lighting device 10 depicted in FIG. 1.

FIG. 3 illustrates a lighting device 23 that is similar to the lighting device 10 depicted in FIG. 1, except that the lighting device 23 further comprises a pivotable locking member 24. The locking member 24 is shown in a locked position, and it can be pivoted to at least one unlocked position in which it does not extend beneath (in the orientation depicted in FIG. 3) the solid state light emitter support member 12, whereby the solid state light emitter support member 12 can be removed from the light engine module 11 by being moved downward (in the orientation depicted in FIG. 3).

FIG. 4 illustrates a lighting device element 40 in accordance with the present inventive subject matter. Referring to FIG. 4, the lighting device element 40 comprises a housing member 41, a lens 42, and an electrical connector 43. The housing member 41 comprises a plurality of fins 44. In addition, a cavity 45 is defined in the housing member 41, and a light engine component can be inserted through an opening 46 to be positioned in the cavity 45. The lighting device element 40 also comprises a locking member 47 which is pivotable about a support member 48 and which is shown in a locked position (in which if a light engine component were positioned in the cavity 45, the locking member 47 would hold the light engine component in the cavity 45), and which can be moved to an unlocked position (in which if a light engine component were positioned in the cavity 45, the light engine component could be removed from the cavity 45, or if a light engine component were not positioned in the cavity 45, a light engine component could be inserted through the opening 46 and into the cavity 45). As seen in FIG. 4, a portion of the cavity 45 is exposed to the lens 42.

FIG. 5 illustrates a lighting device element 50 in accordance with the present inventive subject matter. Referring to FIG. 5, the lighting device element 50 comprises a housing member 51, a transparent lens 52, and a pair of electrically conductive elements 53 and 54 electrically connected respectively to a pair of electrical contacts 55. The housing member 51 comprises a plurality of fins 56. In addition, a cavity 57 is defined between the housing member 51 and the lens 52. FIG. 5 also depicts a light engine component in the form of a light engine module 58 that can be inserted through an opening 59 defined between the housing member 51 and the lens 52 to be positioned in the cavity 57. The light engine module 58 comprises a solid state light emitter support member 60, a solid state light emitter 61 mounted on the solid state light emitter support member 60, and a pair of electrical contacts 62 and 63. As seen in FIG. 5, the transparent lens 52 defines a hollow region 64.

FIG. 9 depicts a different light engine module 90 that can be used in place of the light engine module 58 depicted in FIG. 5. Referring to FIG. 9, the light engine module 90 comprises a solid state light emitter support member in the form of a circuit board 91. A solid state light emitter 92, a pair of electrical contacts 93 and 94, a number of other circuitry components 95 and electrical traces 96 are provided on the circuit board 91.

FIG. 6 illustrates a lighting device 65 in accordance with the present inventive subject matter. Referring to FIG. 6, the lighting device 65 comprises a housing member 66, a light engine component in the form of a light engine module 67 and a retaining structure 68 in the form of a spring element that holds the light engine module 67 in place relative to the housing member 66. The housing member 66 comprises a plurality of heat dissipation fins 69. The light engine module 67 comprises a solid state light emitter support member 70 and a solid state light emitter 71 mounted on the solid state light emitter support member 70. In other embodiments, any other suitable retaining structure can be employed to hold the light engine module 67 in place relative to the housing member 66, e.g., a clip (e.g., clips as used in many cellular telephones to hold SIM cards), a helical spring, etc. In any embodiments that comprise one or more retaining structures, the retaining structure (or one or more of the retaining structures) can be completely removable (e.g., they can snap into place), can pivot about a fulcrum, or can remain attached at all times (e.g., they can flex to provide retention).

FIG. 7 illustrates a lighting device 72 in accordance with the present inventive subject matter. Referring to FIG. 7, the lighting device 72 comprises a housing member 73 and a light engine component in the form of a light engine module 74. The housing member 73 comprises a plurality of heat dissipation fins 75. The light engine module 74 comprises a solid state light emitter support member 76 and a solid state light emitter 77 mounted on the solid state light emitter support member 76, The housing member 73 has a notch 78 into which a portion (i.e., the lower region 83) of the light engine module 74 can be inserted.

In the embodiment depicted in FIG. 7, heat from the solid state light emitter 77 can readily travel downward (in the orientation depicted in FIG. 7) and/or laterally. In the embodiment depicted in FIG. 7, the solid state light emitter support member 76 has a generally T-shaped cross-section. In other embodiments, a solid state light emitter support member can be provided that has any other suitable shape, e.g., a shape that has a U-shaped cross-section, an L-shaped cross-section, a C-shaped cross-section, etc.

In the embodiment depicted in FIG. 7, the sides of the lower region 83 of the solid state light emitter support member 76 are substantially parallel (and vertical), but the sides of the lower region 83 can instead be of any other suitable shape, e.g., tapered (in the vertical direction and/or in the lateral direction).

FIG. 8 illustrates a lighting device 80 in accordance with the present inventive subject matter. Referring to FIG. 8, the lighting device 80 is similar to the lighting device 72 depicted in FIG. 7, except that the lighting device 80 further comprises a screw 81 that can be threaded through a hole 82 (that extends through the solid state light emitter support member 76) and into the housing member 73.

FIG. 10 is an overhead view of a lighting device 100 that comprises a housing member 101 on which a light engine component in the form of a light engine module 102 is removably supported. The light engine module 102 comprises a solid state light emitter support member 103 and a solid state light emitter 104. The lighting device 100 also comprises four incandescent light sources 105 that are also mounted on the housing member 101.

FIG. 11 is a sectional view of a lighting device 110 in accordance with the present inventive subject matter. Referring to FIG. 11, the lighting device 110 comprises a lighting device element 111 and a light engine component in the form of a light engine module 112. The lighting device element 111 comprises a housing member 113 and a transparent lens 114. The light engine module 112 comprises a solid state light emitter support member 115 and a solid state light emitter 116 mounted on the solid state light emitter support member 115. The solid state light emitter support member 115 comprises a clip element 117 that is spring biased downward (in the orientation depicted in FIG. 11) to push a protrusion 118 on the clip element 117 downward into a recess 119 in the housing member 113, thereby inhibiting lateral movement of the light engine module 112 relative to the housing member 113.

FIG. 12 depicts a representative example of an arrangement of solid state light emitters on a solid state light emitter support member. Referring to FIG. 12, there is shown a light engine module 180 that comprises twelve solid state light emitters 181 and 182. The respective solid state light emitters 181 and 182 can be selected so as to emit light of any desired wavelength range (or color). In some embodiments, for example, the eight solid state light emitters 181 can be phosphor light emitting diodes (i.e., light emitting elements that comprise at least one light emitting diode and a luminescent material, e.g., a phosphor) and the four solid state light emitters 182 can be light emitting diodes. In some embodiments according to the arrangement depicted in FIG. 12, the solid state light emitters 181 can be phosphor light emitting diodes that emit BSY light and/or the solid state light emitters 182 can be light emitting diodes that emit highly saturated light, e.g., red light. In some embodiments, the solid state light emitters 181 and 182 comprise light emitting diodes that emit red light, light emitting diodes that emit green light and light emitting diodes that emit blue light, i.e., the light engine module 180 is an RGB module (in some of such embodiments, the red, green and blue light emitters can be mixed so as to assist in mixing the light exiting from the light engine module 180). In some embodiments, the solid state light emitters 181 can be phosphor light emitting diodes that emit white light and the solid state light emitters 182 can be light emitting diodes that emit red light. In some embodiments, the solid state light emitters 181 can be phosphor light emitting diodes that emit warm white light and the solid state light emitters 182 can be light emitting diodes that emit cyan light.

In some embodiments, at least some heat is extracted through a peripheral edge of a light engine module, e.g., through the vertical (in the orientation depicted) sides of a first support structure 824 in the light engine module shown in FIGS. 13-14 (and optionally through other structures). FIG. 13 is an exploded perspective view of a portion of a light engine module 820 that comprises a first circuit board 821 on which a plurality of solid state light emitters 822 are mounted, a second circuit board 823 on which a compensation circuit is mounted, a first support structure 824 (to which the first circuit board 821 and the second circuit board 823 are attached permanently or removably), and four electrical connection structures 825 that provide electrical connection between the first circuit board 821 and the second circuit board 823. As can be seen in FIG. 13, the first circuit board 821, the first support structure 824 and the second circuit board 823 each have recessed regions 826 in which corresponding portions of the electrical connection structures 825 fit. As seen in FIG. 13, the first circuit board 821 and the second circuit board 823 each have approximately similar diameters, while the first support structure 824 has a slightly larger diameter. FIG. 14 is a sectional view of the light engine module 820 shown in FIG. 13. As shown in FIG. 14, each of the electrical connection structures 825 includes an electrical conductor 829 and an insulation element 830. As also shown in FIG. 14, the recessed regions 826 in the first support structure 824 include indented regions 827, into which corresponding extended regions 828 of the insulation 830 in the electrical connection structures 825 extend.

FIGS. 15-16 illustrate a lighting device 140 in accordance with the present inventive subject matter. FIG. 15 is a sectional view of the lighting device 140, and FIG. 16 is a sectional view taken along plane 16-16 shown in FIG. 15.

Referring to FIG. 15, the lighting device 140 comprises a lens 141, a housing member 142 an electrical connector 143 and a light engine component in the form of a light engine module 144. The light engine module 144 is mounted in the housing member 142 and its curved edges are in contact with the housing member 142.

Referring to FIG. 16, a plurality of solid state light emitters 146 are mounted on a first surface of a solid state light emitter support member 145, the solid state light emitter support member 145 is mounted within the housing member 142, and the first surface does not fill the entire cross-section of the housing member 142, so that the majority of the light emitted by the plurality of solid state light emitters 146 travels into a first hemisphere defined by the first surface and in which the plurality of solid state light emitters 146 are located (i.e., upward in the orientation shown in FIG. 15), but some light emitted by the one or more of the plurality of solid state light emitters 146 also travels into a second hemisphere which is complementary to the first hemisphere (i.e., downward in the orientation shown in FIG. 15), through spaces defined between the perimeter of the solid state light emitter support member 145 and the inside wall of the housing member 142. Some or all of the housing member 142 can be transparent (or substantially transparent or partially transparent), in order to allow such light in the second hemisphere to exit from the lighting device 140.

FIG. 17 is a cross-sectional view of a lighting device 290 in accordance with the present inventive subject matter. Referring to FIG. 17, there is shown a lighting device 290 that comprises a lens 291, a housing member 292 and an electrical connector 293. Positioned within the lighting device 290 is a light engine component in the form of a light engine module 294 that comprises a solid state light emitter support member 295 in the form of a printed circuit board (on which a plurality of solid state light emitters 296 are mounted), a heat spreader 297, a compensation circuit 298 and a temperature sensor 299. The heat spreader 297 can be made of any suitable material, e.g., copper. The temperature sensor 299 can be any suitable temperature sensor, e.g., a thermistor. As shown in FIG. 17, in this embodiment, the temperature sensor 299 is positioned between the heat spreader 297 and the compensation circuit 298. In addition, as shown in FIG. 17, in this embodiment, the heat spreader 297, the compensation circuit 298 and the temperature sensor 299 are all mounted on a surface of the solid state light emitter support member 295 that is opposite to the surface of the solid state light emitter support member 295 on which the solid state light emitters 296 are mounted.

FIG. 18 is an exploded perspective view of a portion of a light engine module 800 that comprises a first circuit board 801 on which a plurality of solid state light emitters 802 are mounted, a second circuit board 803 on which a compensation circuit is mounted, a first support structure 804 (to which the first circuit board 801 and the second circuit board 803 are attached permanently or removably), and four electrical connection structures 805 that provide electrical connection between the first circuit board 801 and the second circuit board 803. As can be seen in FIG. 18, the first circuit board 801, the first support structure 804 and the second circuit board 803 each have recessed regions 806 in which corresponding portions of the electrical connection structures 805 fit. As seen in FIG. 18, the first circuit board 801, the first support structure 804 and the second circuit board 803 each have approximately the same diameter.

FIG. 19 is a sectional view of the light engine module 800 shown in FIG. 18. As shown in FIG. 19, each of the electrical connection structures 805 includes an electrical conductor 809 and an insulation element 810. As also shown in FIG. 19, the recessed regions 806 in the first support structure 804 include indented regions 807, into which corresponding extended regions 808 of the insulation 810 in the electrical connection structures 805 extend. FIG. 19 also shows a header 811 mounted on the second circuit board 803 that can be readily connected to a power supply or a power source.

FIG. 20 illustrates a lighting device 200 in accordance with the present inventive subject matter. Referring to FIG. 20, the lighting device 200 comprises a housing member 201, a light engine component in the form of a solid state light emitter 202 and a retaining structure 203 in the form of a spring element that holds the light engine component 202 in place relative to the housing member 201. The housing member 201 comprises a plurality of heat dissipation fins 204. In other embodiments, any other suitable retaining structure can be employed to hold the solid state light emitter 202 in place relative to the housing member 201, e.g., a clip (e.g., clips as used in many cellular telephones to hold SIM cards), a helical spring, etc. In any embodiments that comprise one or more retaining structures, the retaining structure (or one or more of the retaining structures) can be completely removable (e.g., they can snap into place), can pivot about a fulcrum, or can remain attached at all times (e.g., they can flex to provide retention).

FIG. 21 illustrates a lighting device 210 in accordance with the present inventive subject matter. Referring to FIG. 21, the lighting device 210 comprises a light engine component in the form of a packaged LED 211. The lighting device 210 further comprises a lighting device element that comprises a housing member 213 and a reflective element 214. The housing member 213 comprises heat dissipation structures in the form of a plurality of heat dissipation fins 215 and a plurality of heat dissipation pins 216. The packaged LED 211 comprises a light emitting diode (not illustrated in FIG. 21), an encapsulant 218 in which the light emitting diode is embedded, and a pin-shaped connector 212 that fits snugly (to provide mechanical engagement) inside a cavity 217 in the housing member 213. The pin-shaped connector 212 has electrical contact portions that make electrical contact with electrical contact portions inside the cavity 217.

FIG. 22 illustrates a lighting device 220 in accordance with the present inventive subject matter. Referring to FIG. 22, the lighting device 220 comprises a light engine component in the form of a solid state light emitter 221. The lighting device 220 further comprises a lighting device element that comprises a housing member 222 and a reflective element 223. The solid state light emitter 221 can be mechanically engaged by removably press-fitting its lower (in the orientation depicted in FIG. 22) edge in an opening in the reflective element 223. The housing member 222 comprises heat dissipation structures in the form of a plurality of heat dissipation fins 224 and a plurality of heat dissipation pins 225.

In addition, the housing member 224 has a pair of electrical contact regions 226, and the solid state light emitter 221 has a pair of electrical contact regions 227, the respective electrical contact regions 226 being in contact with the respective electrical contact regions 227.

As noted above, as appropriate, any light engine component described herein can be attached to one or more lighting device elements (e.g., a housing member, a lens and/or an electrical connector) in any suitable way, e.g., any of the ways of attaching a light engine component to a lighting device element as described herein.

For instance, in the case of the embodiment depicted in FIGS. 18 and 19, the diameter of the first support structure can be smaller than the diameters of the first and second circuit boards, and during assembly, the light engine component can be positioned within a lighting device element by the respective diameters of the first support structure, the first circuit board and/or the second circuit board being accommodated in the lighting device element only if the light engine component is properly positioned relative to the lighting device element.

In some embodiments that include recessed regions (e.g., those depicted in FIGS. 13, 14, 18 and 19), the recessed regions can be of any desired size, e.g., large enough to accommodate electrical connection structures, so that a light engine component can fit within a tubular structure defining a cylindrical (or frustoconical, or any other shaped) space and having an internal diameter just slightly larger than the diameters of support member and/or circuit boards (or within a space of any cross-sectional shape that may or may not taper or have ledges, etc.). Included among such embodiments are some embodiments in which surface area of contact (e.g., between a peripheral edge of a support structure and a tubular structure in which a light engine component (that comprises the support structure) is positioned) is increased or maximized.

As noted above, a lighting device element in any embodiment can be round or any other regular shape (e.g., square cross-section, oval cross-section, triangular cross-section, hexagonal cross-section, etc.) or irregular shape.

While certain embodiments of the present inventive subject matter have been illustrated with reference to specific combinations of elements, various other combinations may also be provided without departing from the teachings of the present inventive subject matter. Thus, the present inventive subject matter should not be construed as being limited to the particular exemplary embodiments described herein and illustrated in the Figures, but may also encompass combinations of elements of the various illustrated embodiments.

Many alterations and modifications may be made by those having ordinary skill in the art, given the benefit of the present disclosure, without departing from the spirit and scope of the inventive subject matter. Therefore, it must be understood that the illustrated embodiments have been set forth only for the purposes of example, and that it should not be taken as limiting the inventive subject matter as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the inventive subject matter.

Any two or more structural parts of the lighting devices described herein can be integrated. Any structural part of the lighting devices or light engine components described herein can be provided in two or more parts (which may be held together in any known way, e.g., with adhesive, screws, bolts, rivets, staples, etc.).

The invention claimed is:

1. A lighting device, comprising:
a lighting device element; and
at least a first light engine component,
the lighting device element comprising at least a first housing member, at least a first cavity and at least a first locking member,
the first light engine component comprising at least a first support member and at least a first solid state light emitter,
at least a first portion of the first light engine component in the first cavity,
the first locking member having at least a first unlocked position and at least a first locked position,
the first locking member is in the first locked position, in which the first locking member holds at least the first portion of the first light engine component in the first cavity, and
if the first locking member were in the first unlocked position, the first locking member would not hold the first light engine component in the first cavity.

2. A lighting device as recited in claim 1, wherein an entirety of the first light engine component is in the first cavity.

3. A lighting device as recited in claim 1, wherein;
the first cavity is a notch.

4. A lighting device as recited in claim 3, wherein the support member has a generally T-shaped cross-section.

5. A lighting device as recited in claim 1, wherein:
the lighting device element further comprises a transparent lens,
the first cavity is defined between the housing member and the lens, and
the first solid state light emitter is on the support member.

6. A lighting device as recited in claim 5, wherein:
the lighting device element further comprises at least a first lighting device element electrical contact,
the light engine component comprises at least a first light engine component electrical contact,
the first lighting device element electrical contact engages the first light engine component electrical contact.

7. A lighting device as recited in claim 6, wherein:
the first lighting device element electrical contact comprises a convex region that is in contact with a concave region of the first light engine component electrical contact.

8. A lighting device as recited in claim 6, wherein:
the first lighting device element electrical contact comprises a concave region that is in contact with a convex region of the first light engine component electrical contact.

9. A lighting device as recited in claim 5, wherein:
the support member comprises a first retaining structure,
the lighting device element comprises a second retaining structure, and the first retaining structure engages the second retaining structure.

10. A lighting device as recited in claim 9, wherein:
the first retaining structure is a clip element that is spring biased,
the second retaining structure is a first recess, and
the spring bias pushes a portion of the clip element into the first recess.

11. A lighting device, comprising:
a lighting device element;
at least a first light engine component,
the first light engine component comprising a solid state light emitter support member, at least a first solid state light emitter and at least a first electrical contact region,
the first solid state light emitter support member comprising at least a first surface and at least a first tapered mechanical engagement region, the first solid state light emitter on the first surface of the solid state light emitter support member, the first electrical contact region on the at least a first tapered mechanical engagement region
the lighting device element comprising at least a first housing member and at least a second electrical contact region, the first housing member comprising at least a second tapered mechanical engagement region, the second electrical contact region on the second tapered mechanical engagement region,
the first tapered mechanical engagement region in contact with the second tapered mechanical engagement region,
the first electrical contact region in contact with the second electrical contact region.

12. A lighting device as recited in claim 11, wherein the first housing member comprises at least a first heat dissipation structure.

13. A lighting device as recited in claim 11, wherein:
the lighting device element comprises at least a first locking member that has at least a first unlocked position and at least a first locked position,
the first locking member holds the first light engine component in place relative to the lighting device element if the first locking member is in the first locked position, and
the first locking member does not hold the first light engine component in place relative to the lighting device element if the first locking member is in the first unlocked position.

14. A lighting device as recited in claim 11, wherein:
the lighting device element comprises at least a first substantially transparent element, and
if the first solid state light emitter is illuminated, at least some of the light emitted by the first solid state light emitter would pass through at least a portion of the first substantially transparent element.

15. A lighting device as recited in claim 14, wherein the first substantially transparent element defines at least a first hollow region.

16. A lighting device, comprising:
a lighting device element; and
at least a first light engine component,
the lighting device element comprising at least a first housing member and at least a first cavity, the first housing member comprising a first housing member first surface,
the first light engine component comprising at least a first support member and at least a first solid state light emitter, the first support member comprising at least a first support member first surface and a first support member second surface, the first solid state light emitter on the first support member first surface, the first support member second surface facing the first housing member first surface,
at least a first portion of the first light engine component in the first cavity,
the lighting device element further comprises at least a first lighting device element electrical contact, the first lighting device element electrical contact on the first housing member first surface,
the first support member comprises at least a first light engine component electrical contact on the first support member second surface,
the first lighting device element electrical contact engages the first light engine component electrical contact,
at least a portion of one of the first lighting device element electrical contact and the first light engine component electrical contact comprises a concave region,
at least a portion of the other of the first lighting device element electrical contact and the first light engine component electrical contact comprises a convex region, and
the concave region is in contact with the convex region.

17. A lighting device as recited in claim 16, wherein:
the first support member second surface is substantially flat, and
the first housing member first surface is substantially flat.

* * * * *

UNITED STATES PATENT AND TRADEMARK OFFICE
CERTIFICATE OF CORRECTION

PATENT NO. : 9,644,822 B2
APPLICATION NO. : 14/581152
DATED : May 9, 2017
INVENTOR(S) : Antony Paul Van De Ven Page 1 of 1

It is certified that error appears in the above-identified patent and that said Letters Patent is hereby corrected as shown below:

On the Title Page

Item (72) Inventor:
Please change: "Anthony Paul Van De Ven, Hong Kong (CN)" to -- Antony Paul Van De Ven, Hong Kong (CN) --.

Signed and Sealed this
Thirty-first Day of October, 2017

Joseph Matal
*Performing the Functions and Duties of the
Under Secretary of Commerce for Intellectual Property and
Director of the United States Patent and Trademark Office*